United States Patent
Chang et al.

(10) Patent No.: US 7,631,059 B2
(45) Date of Patent: Dec. 8, 2009

(54) VPN SERVICE MANAGEMENT SYSTEM HAVING A VPN SERVICE MANAGER FOR A PROVIDER NETWORK AND A VPN SERVICE AGENT FOR A CUSTOMER NETWORK AND ENABLING RAPID CHANGE OF VPN SERVICE CONDITIONS

(75) Inventors: Ta-Wei Chang, Kawasaki (JP); Toshimasa Arai, Kawasaki (JP); Yasuko Onodera, Kawasaki (JP); Hiroaki Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1105 days.

(21) Appl. No.: 10/117,716

(22) Filed: Apr. 5, 2002

(65) Prior Publication Data

US 2003/0079043 A1 Apr. 24, 2003

(30) Foreign Application Priority Data

Oct. 18, 2001 (JP) ............... 2001-320913

(51) Int. Cl.
*G06F 13/00* (2006.01)
(52) U.S. Cl. ..................................... 709/223
(58) Field of Classification Search .......... 709/223–246
See application file for complete search history.

(56) References Cited

U.S. PATENT DOCUMENTS 6,594,355 B1* 7/2003 Deo et al. .................... 379/219
6,611,867 B1* 8/2003 Bowman-Amuah ......... 709/224
6,640,248 B1* 10/2003 Jorgensen .................... 709/226
6,662,221 B1* 12/2003 Gonda et al. ................. 709/223
6,862,622 B2* 3/2005 Jorgensen .................... 709/226
2001/0027484 A1 10/2001 Nishi
2002/0124111 A1* 9/2002 Desai et al. .................. 709/246
2002/0169866 A1* 11/2002 Lim et al. .................... 709/223

FOREIGN PATENT DOCUMENTS

| JP | 5-300254 | 11/1993 |
|----|----------|---------|
| JP | 2000-69039 | 3/2000 |
| JP | 2000-341327 | 12/2000 |
| JP | 2001-282760 | 10/2001 |

OTHER PUBLICATIONS

Baek et al., Policy-based Hybrid management architecture for IP-based VPN, Network Operations and Mangement Symposium, 2000 NOMS 2000 Apr. 10-14, 2000, p. 987-988.*
Notice of Reasons for Rejection mailed Aug. 8, 2006.

* cited by examiner

*Primary Examiner*—Robert B Harrell
(74) *Attorney, Agent, or Firm*—Katten Muchin Rosenman LLP

(57) ABSTRACT

A VPN service management system enabling a customer to rapidly and easily change a VPN service condition, that is, a VPN service management system for managing a VPN service for a communication network provided with a customer network and a provider network and having a VPN service manager for managing a VPN service for a provider network and a VPN service agent for managing a VPN service for a customer network. The VPN service manager changes the VPN service condition in real time in accordance with an operation status of the customer network in cooperation with the VPN service agent.

16 Claims, 33 Drawing Sheets

34

| ITEM OF VPN SERVICE CONDITION | CURRENT VALUE | ALLOWABLE VALUE | SETPOINT BANDWIDTH |
|---|---|---|---|
| VPN SERVICE CONDITION 1 | VALUE 1 | ALLOWABLE MAX./MIN. 1 | BANDWIDTH 1 |
| VPN SERVICE CONDITION 2 | VALUE 2 | ALLOWABLE MAX./MIN. 2 | BANDWIDTH 2 |
| --- | --- | --- | --- |
| VPN SERVICE CONDITION N | VALUE N | ALLOWABLE MAX./MIN. N | BANDWIDTH N |

| LEVEL | CURRENT VALUE | CHANGED VALUE |
|---|---|---|
| LEVEL 1: | BEST EFFORT (BF) | 20% UP FROM BF |
| LEVEL 2: | 20% UP | 50% UP |
| LEVEL 3: | 50% UP | 100% UP |

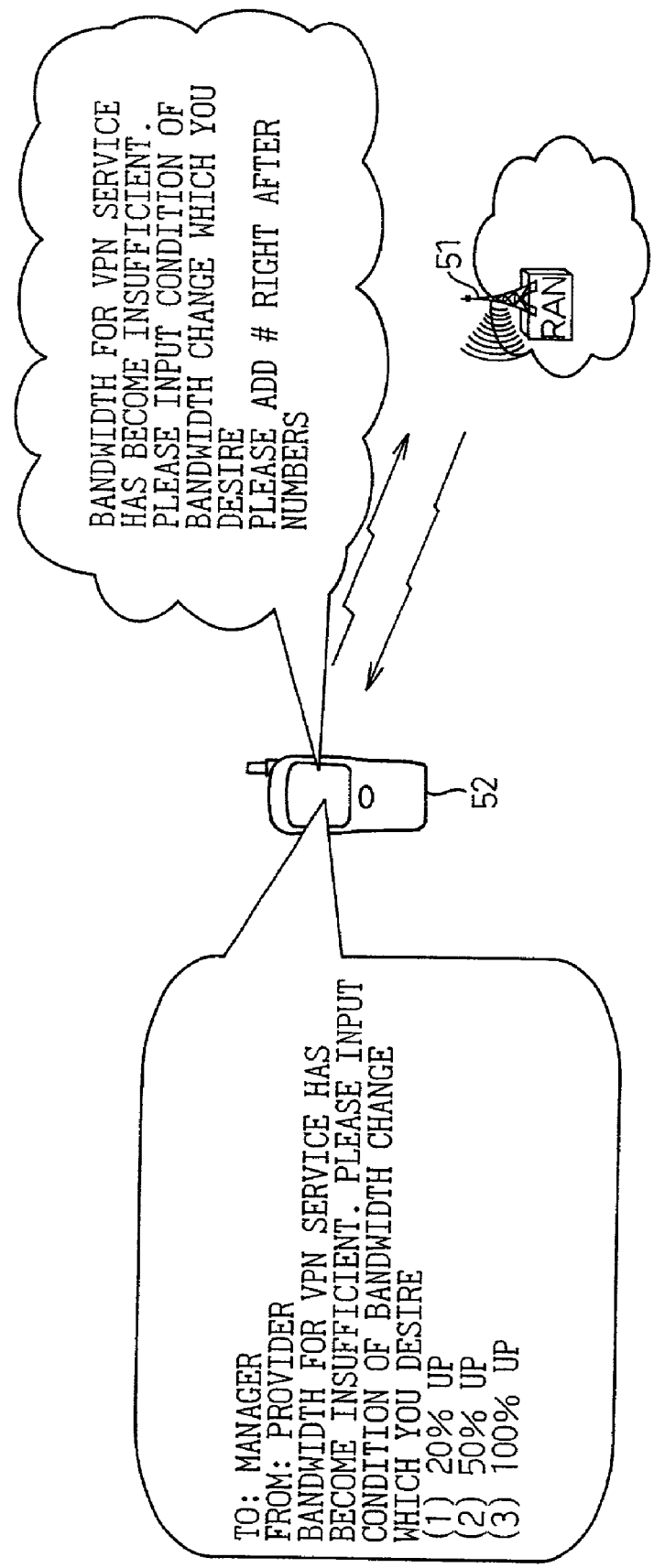

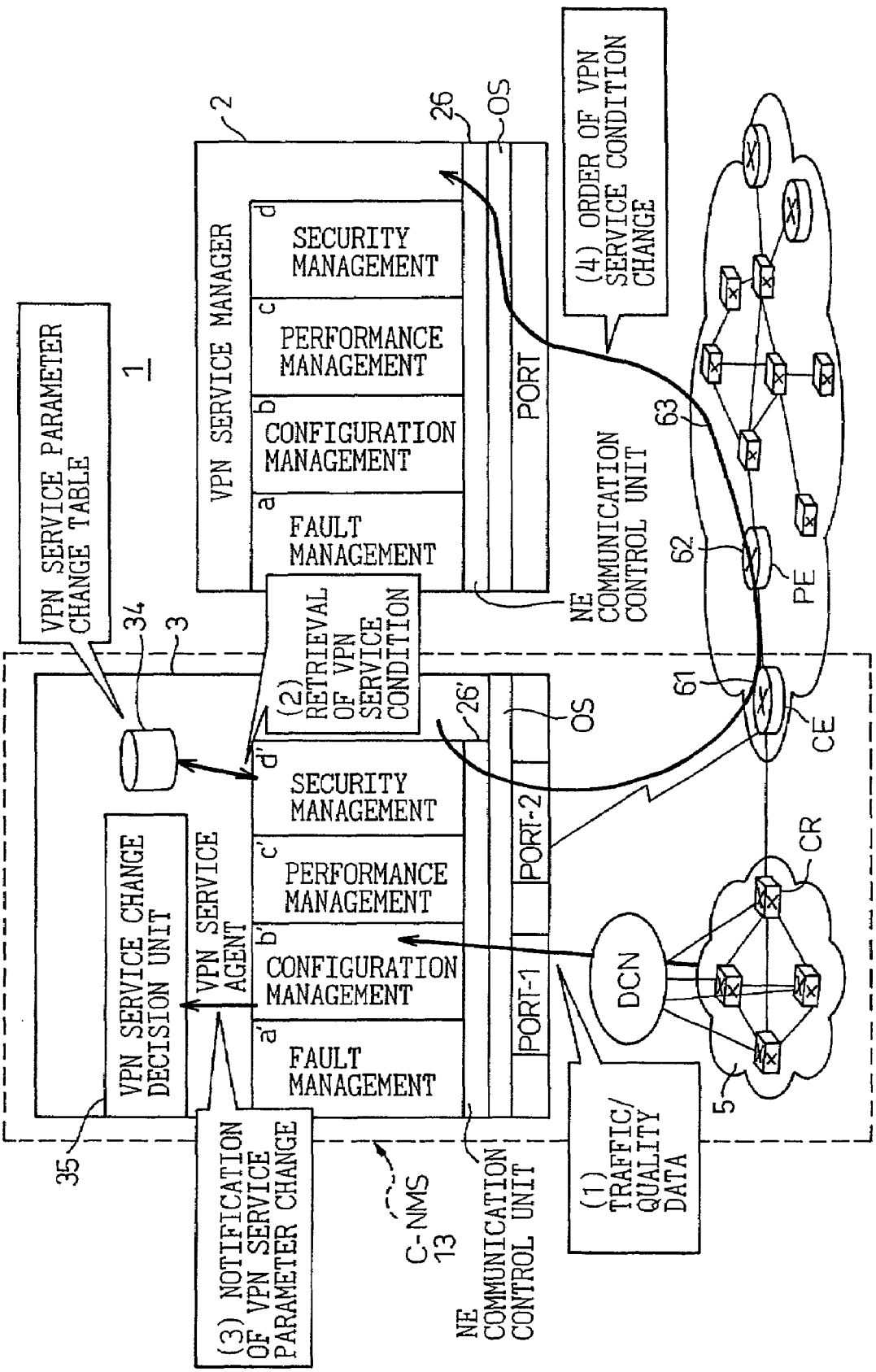

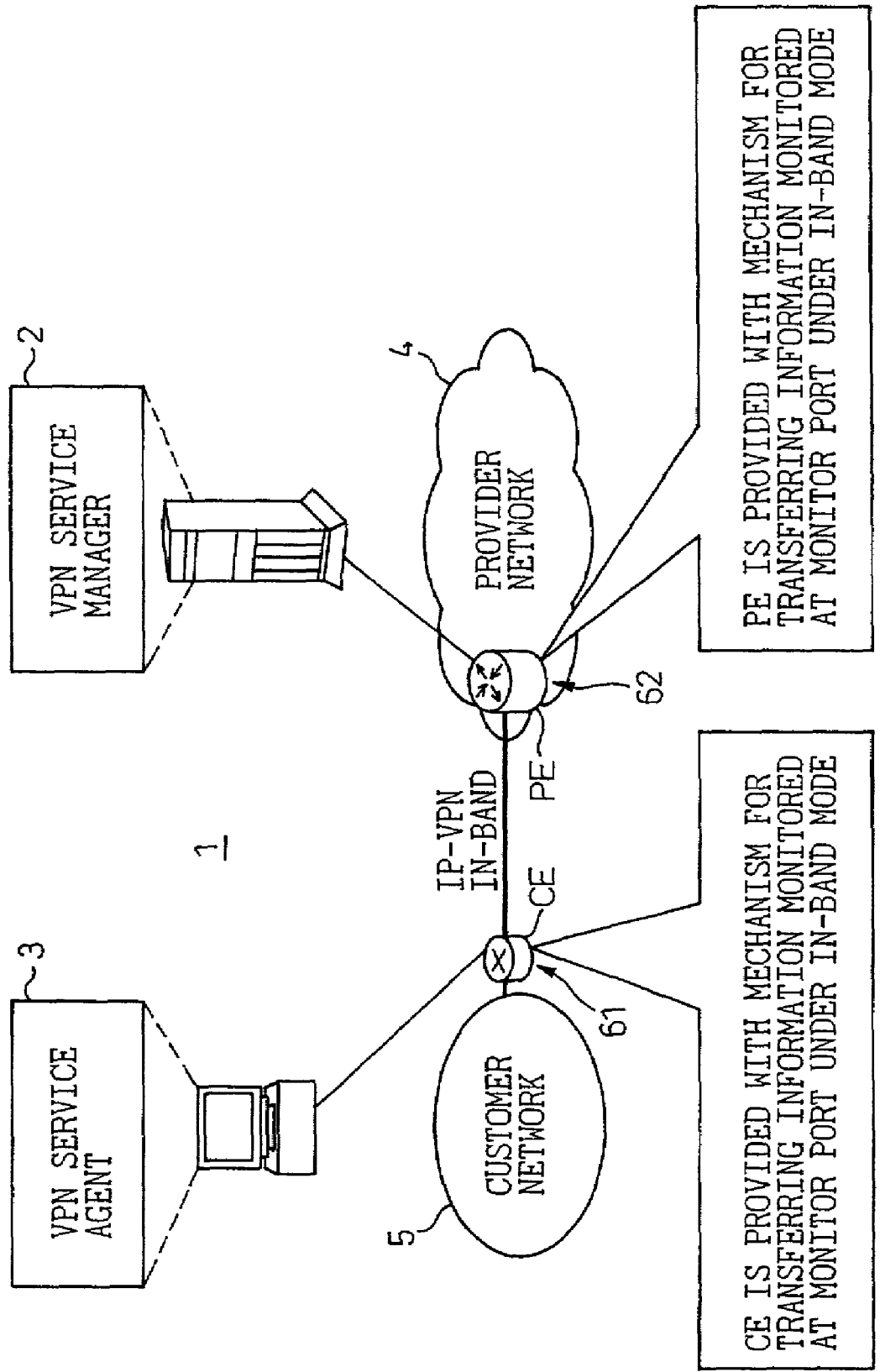

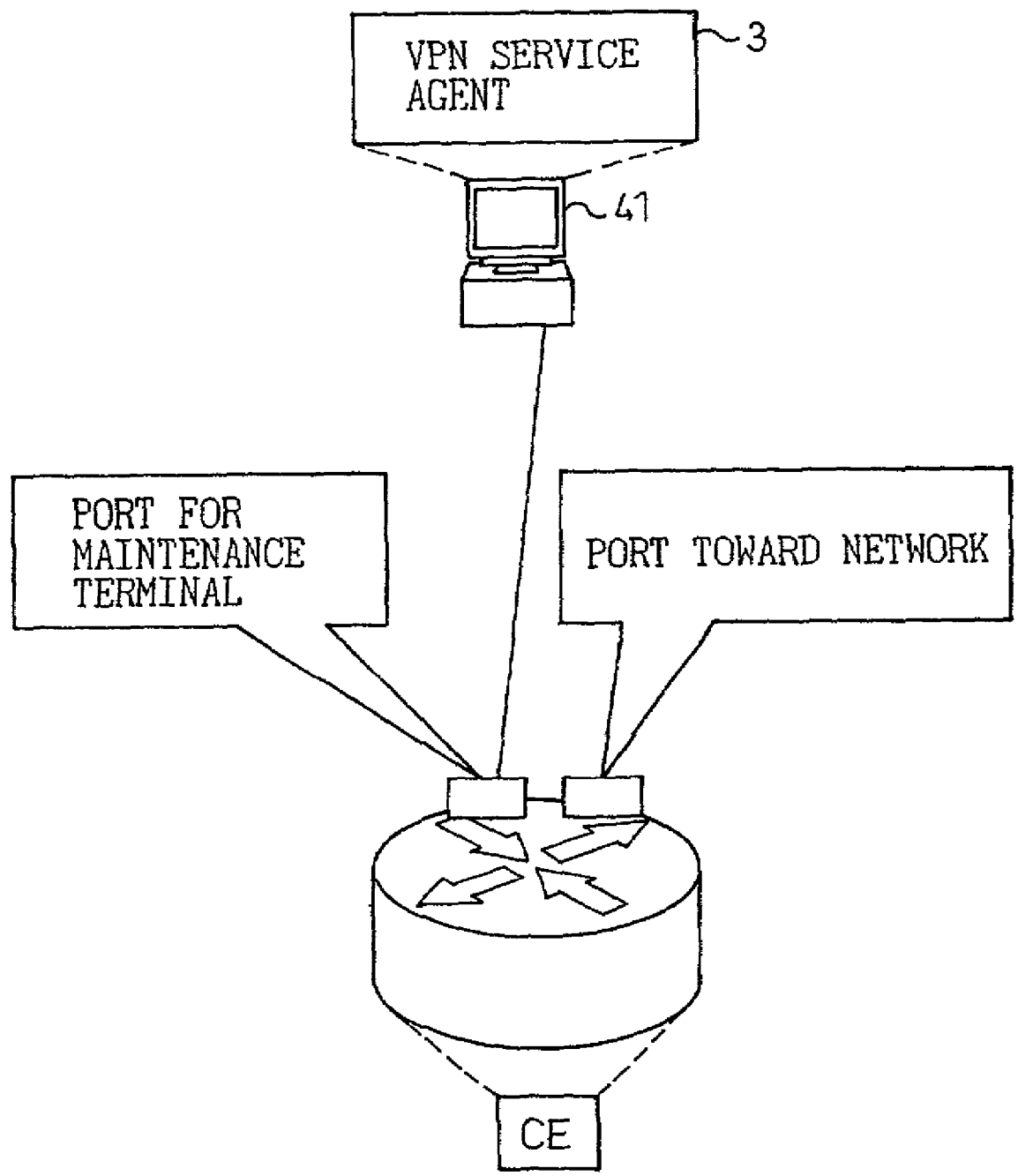

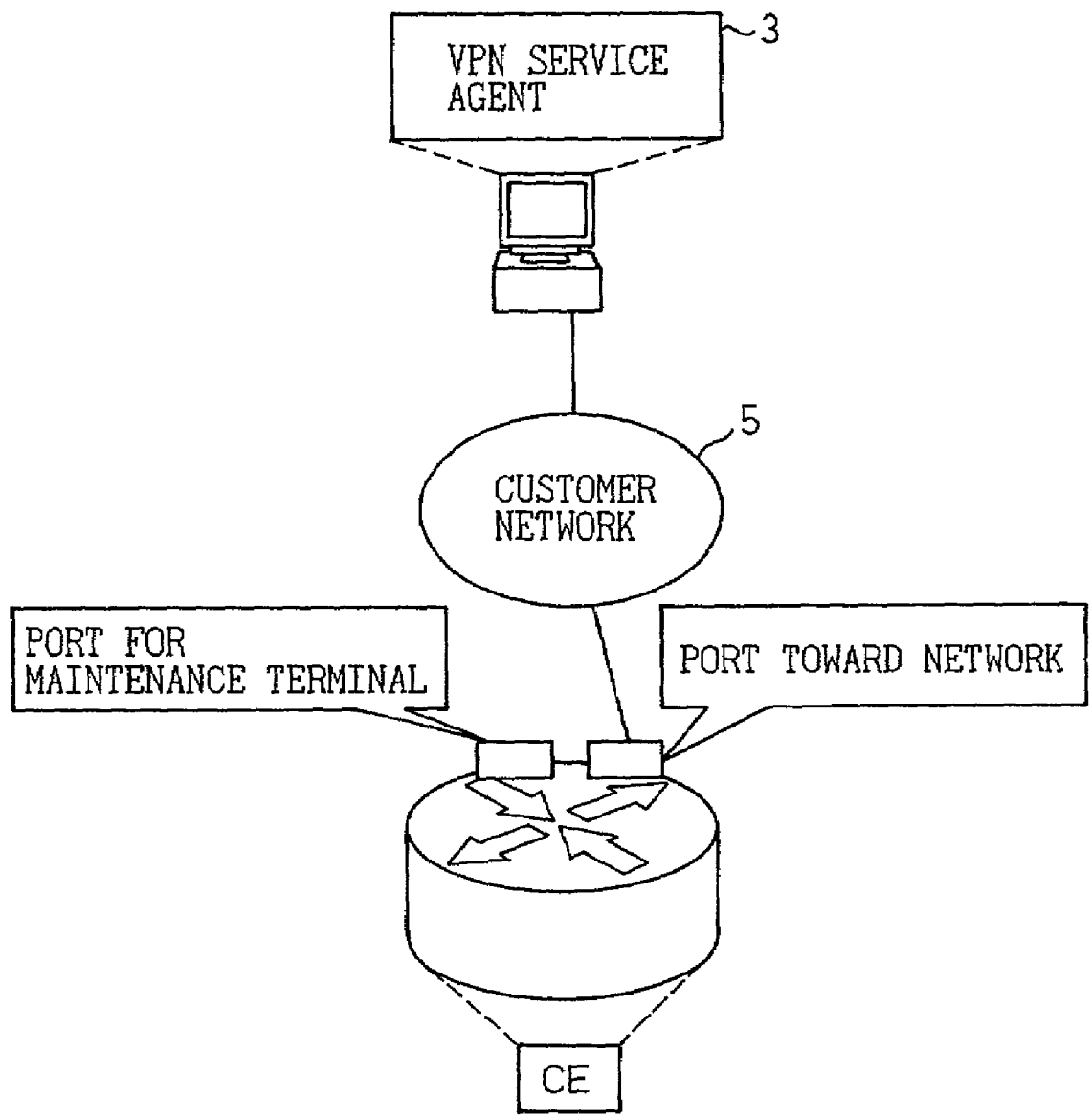

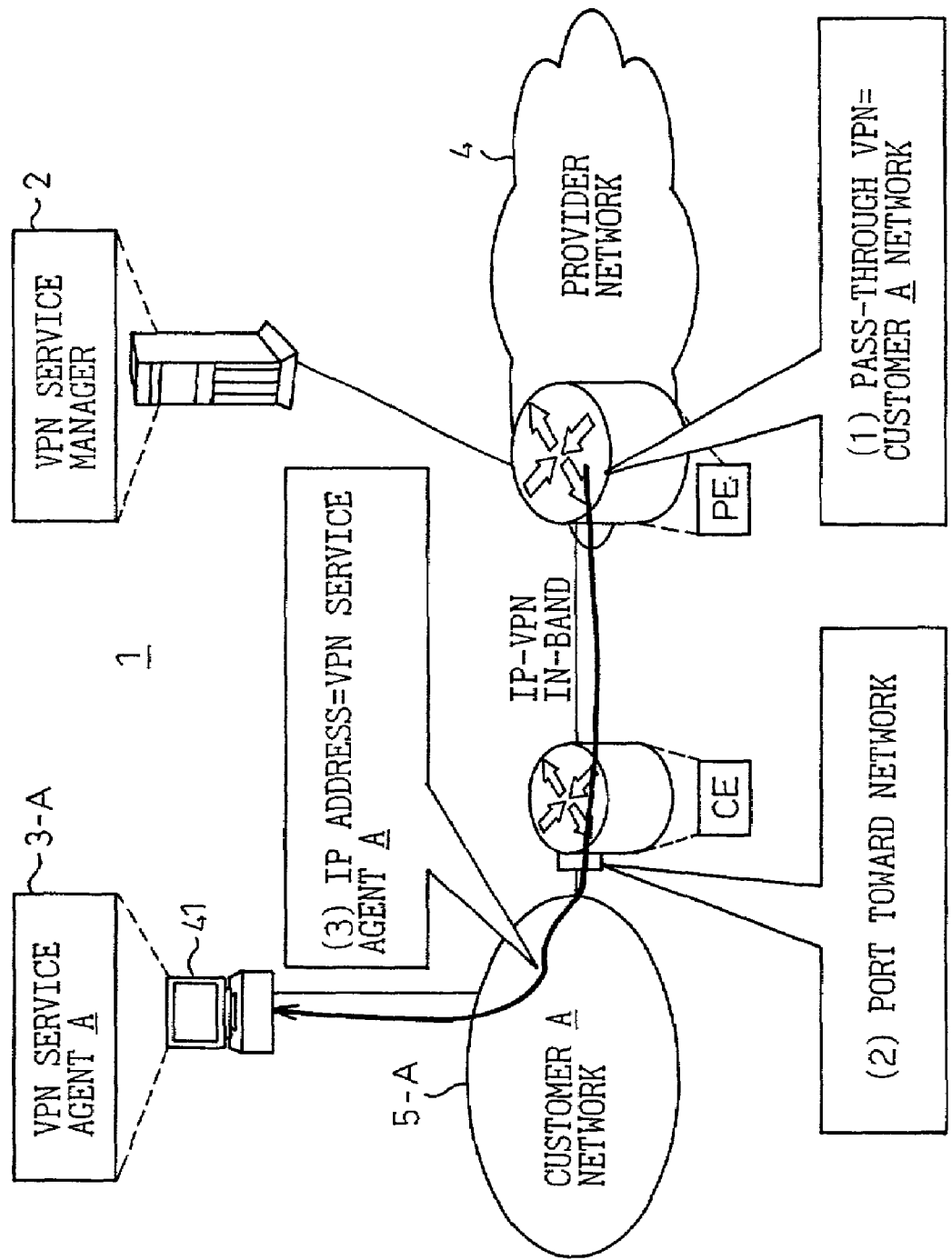

VPN SERVICE MANAGEMENT SYSTEM HAVING A VPN SERVICE MANAGER FOR A PROVIDER NETWORK AND A VPN SERVICE AGENT FOR A CUSTOMER NETWORK AND ENABLING RAPID CHANGE OF VPN SERVICE CONDITIONS

BACKGROUND OF THE INVENTION

1. Field of the Invention

The present invention relates to a virtual private network (VPN) service management system and to a VPN service manager and a VPN service agent comprising that system.

More particularly, the present invention relates to a mode of operation of a VPN service in a case where for example an Internet service provider (ISP), an application service provider (ASP), or a company having a plurality of places of business and operating an extra network among these places uses a VPN provided by a type 1 carrier so as to advance a widearea promotion of business. Note that, in the following explanation, a carrier providing a VPN service will be referred to as a "provider", and the ISP, ASP, company, etc. utilizing the VPN service will be referred to as "customers". Also, networks operated and managed by the provider and the customers will be referred to as a "provider network" and "customer networks", respectively.

2. Description of the Related Art

Along with the various new services appearing one after another on the Internet, for example, on-line banking and Internet telephone, customers mainly utilizing the Internet in business have been increasingly calling for a higher speed and higher quality communications environment at low cost. In such a communications environment, it becomes indispensable to secure network security. Therefore, an IP-VPN capable of utilizing the Internet as a virtual dedicated line is now attracting attention. Providers have started to provide high quality communication services using such IP-VPN's according to their customer needs.

When a customer side uses this IP-VPN high quality communication service, it designates conditions regarding the desired-connecting nodes, guaranteed bandwidth, QoS, policy, data loss (packet loss), delay time, etc. at the time of contracting with the provider in advance and pays a fixed service usage fee in accordance with the contract conditions to the provider side in units of for example months. In this case, if desired, the customer side can change the contract conditions of the IP-VPN high quality communication service (hereinafter also simply referred to as a VPN service) from time to time usually with some charge.

Conventionally, when changing the contract conditions, (i) the customer or its agent applies for the change by means of for example the mail, facsimile, or telephone and makes arrangements for ordering the service from the provider, then (ii) an operator of the provider sets the VPN service conditions necessary for the change. By going through such a process, an environment capable of providing the intended service to a customer is prepared.

Summarizing the problem to be solved by the invention, the procedure for changing the contract conditions between a customer and a provider conventionally took a predetermined period, for example, a few days to a few weeks, from application to when the changed service could be commenced. For this reason, there was the inconvenience that requests for changes of the VPN service usage conditions occurring sporadically or irregularly at the customer side such as in the following examples of use could not be dealt with timely:

1) Example of use at a company: A president of a company wishes to circulate New Year's greetings or announce a rough medium term plan to all members of all places of business at one time via a company intranet.

2) Example of use by ISP: The ISP wishes to double the bandwidths of its existing VPN's at one time for the start of the business of a new service.

3) Example of use by ASP: The ASP wishes to prepare for a rush of applications when offering a Web ticket sale service, for example, only during a period of selling tickets for a popular group.

Also, the network management systems of a customer network and a provider network were configured completely independent from each other, so there was the problem in that the quality conditions or usage conditions of a VPN service could not be easily changed to deal with sudden changes of the VPN service conditions detected inside the customer network, for example, an increase of the traffic or amount of communication packets or a deterioration of an Internet access response performance.

Also, from the standpoint of the provider side, while facilities in the provider network for providing the VPN service can be investigated for the quality conditions, everything from the selection of models to management of the customer edge (CE) installed inside the customer network is entrusted to the customer side, so there was the problem in that it becomes difficult to fulfill a service level agreement (SLA) concluded at the time of contracting due to for example a later change of the model and specifications at the customer edge (CE) side.

SUMMARY OF THE INVENTION

An object of the present invention is to provide a VPN service management system for a IP-VPN service etc.

1) capable of rapidly responding to a demand on the customer side to change the contract conditions between the customer and the provider, 2) capable of easily changing the quality conditions or usage conditions of a IP-VPN service or other VPN service, and 3) capable of always fulfilling a service level agreement concluded by a contract between the customer and the provider.

To attain the above object, the present invention provides a VPN service management system, for managing a VPN service for a communications network provided with a customer network (5) and a provider network (4), which has a VPN service manager (2) for managing the VPN service for the provider network (4) and a VPN service agent (3) for managing the VPN service for the customer network (5). This VPN service manager (2) changes the VPN service conditions in real time in accordance with an operation status of the customer network (5) in cooperation with the VPN service agent (3). By this, a VPN service management system enabling a customer to rapidly and easily change the VPN service conditions is realized.

BRIEF DESCRIPTION OF THE DRAWINGS

The above object and features of the present invention will be more apparent from the following description of the preferred embodiments given with reference to the accompanying drawings, wherein:

FIG. 28 is a view schematically representing advance preparations with the operation manager;

FIG. 29 is a view of the configuration of FIG. 17 with the sixth embodiment applied thereto;

FIG. 30 is a view explaining an in-band means according to the present invention;

FIG. 31 is a view of a first connection method between a customer edge and an agent 3;

FIG. 32 is a view of a second connection method between the customer edge and the agent 3; and FIG. 33 is a view of an example of the connection by the in-band between the manager 2 and the agent 3.

DESCRIPTION OF THE PREFERRED EMBODIMENTS

Preferred embodiments of the present invention will be described in detail below while referring to the attached drawings.

Figure 1:
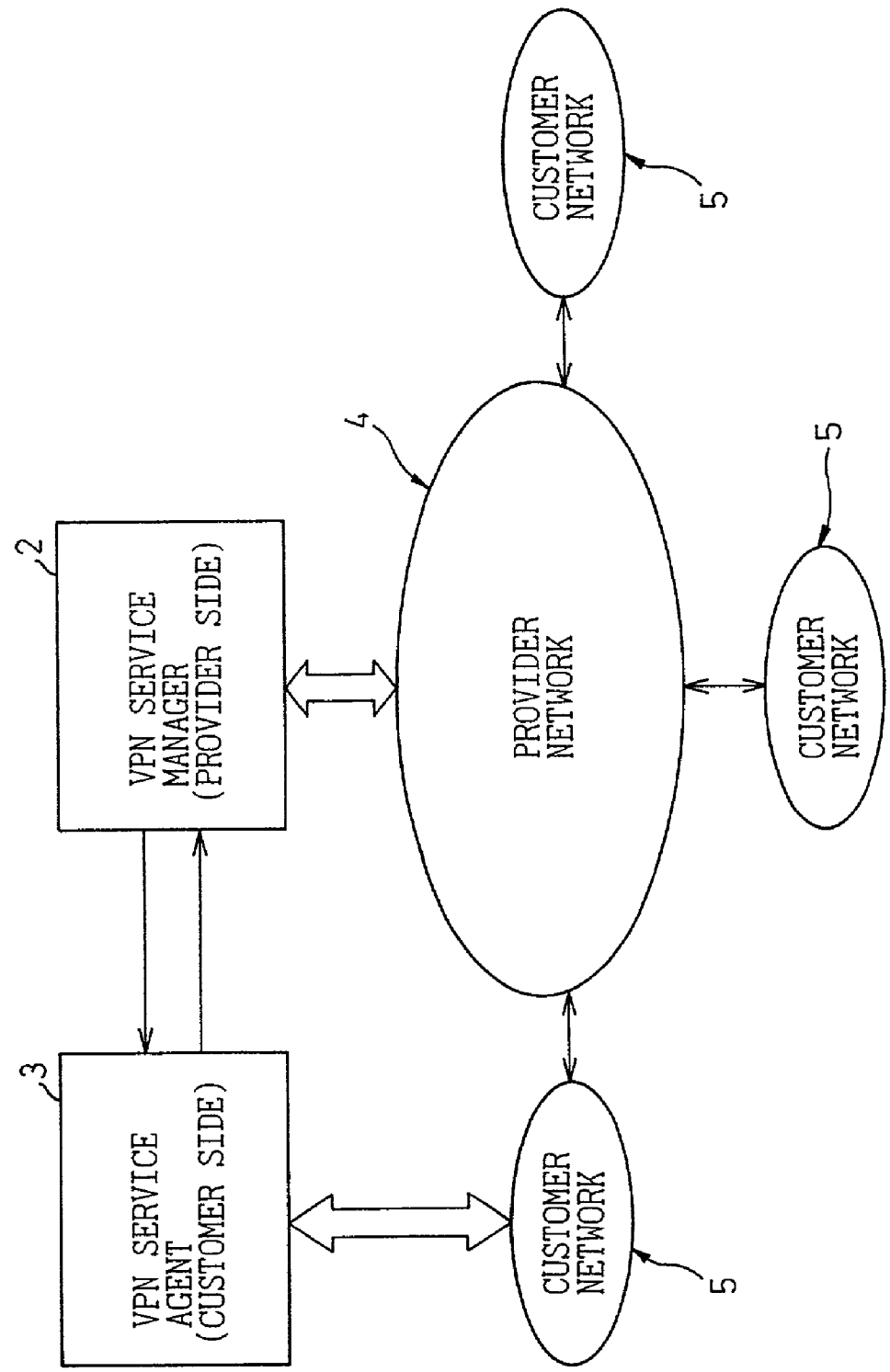
FIG. 1 is a view of the basic configuration of a VPN service management system according to the present invention.

FIG. 1 is a view of the basic configuration of the VPN service management system according to the present invention.

In the figure, reference numeral 1 indicates the VPN service management system. This is a VPN service management system for managing a VPN service for a communication network provided with a customer network 5 for servicing customers and a provider network 4 constructed by the provider for providing the VPN service to the customers and connected to the customer network 5. The system 1 has at least a VPN service manager 2 for managing the VPN service for the provider network 4 and a VPN service agent 3 for managing the VPN service for the customer network 5.

Here, the VPN service manager 2 is configured so as to change the VPN service conditions of the VPN service to be provided by the system 1 in real time in accordance with the operation status of the customer network 5 under the management of the VPN service agent 3 in cooperation with the VPN service agent 3.

Due to the above configuration, the above-mentioned first problem of the related art that a contract of a VPN service cannot be rapidly changed, the second problem that the quality conditions or usage conditions of the VPN service (VPN service condition) cannot be easily changed, and the third problem such that it is difficult to always fulfill the service level agreement can be solved. This will be explained in detail below.

In order to facilitate understanding of the present invention, the intention of the present invention will be clarified first by explaining the present invention as a whole, then components of the present invention will be individually explained.

Figure 2:
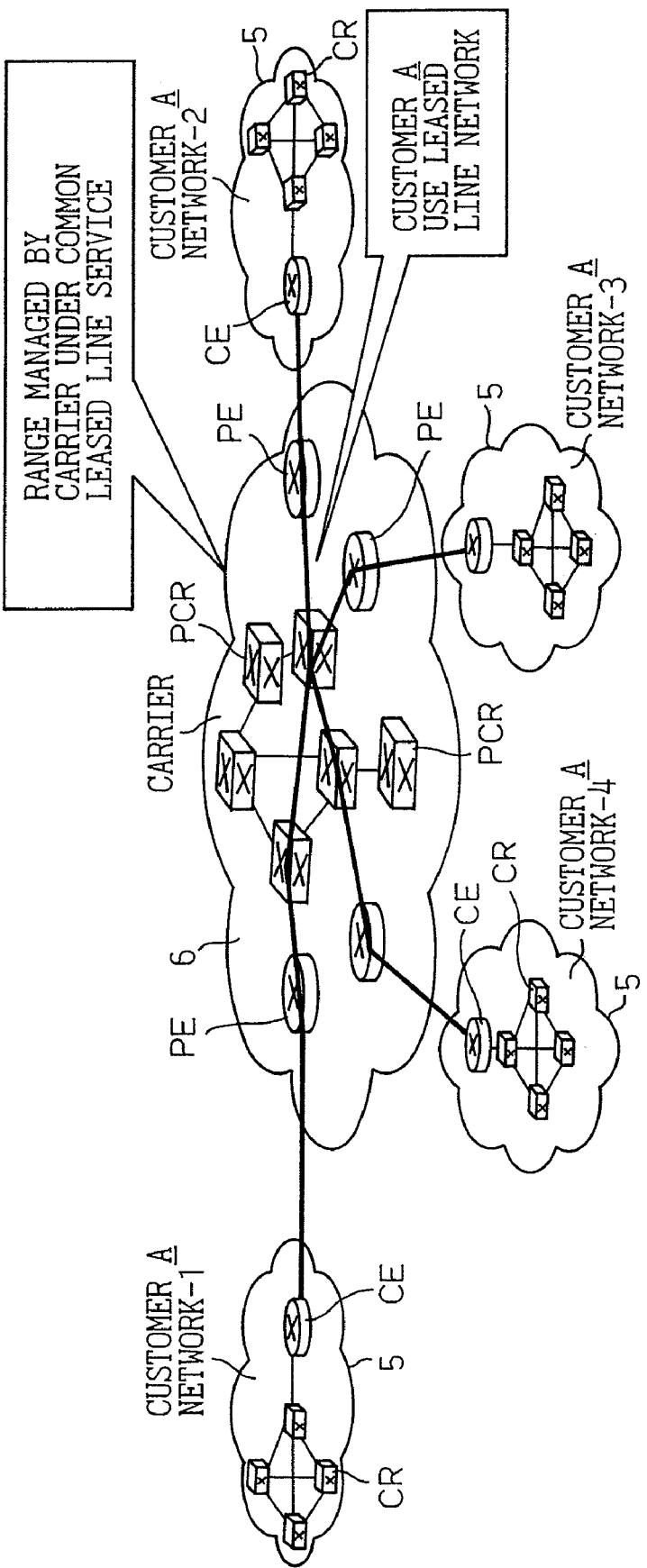
FIG. 2 is a view schematically showing a conventional typical VPN service network.

FIG. 2 is a view schematically showing a conventional typical VPN service network.

In the figure, reference numeral 6 is a carrier network and represents a scope of management of the carrier in a general leased line service.

This carrier network 6 has a plurality of customer networks 5 arranged under it. In the example of the figure, customer A networks 1, 2, 3, and 4 in each of which the customer A has four nodes are shown.

In order to construct the VPN service network among these customer networks 5 centered about the carrier network 6, an illustrated customer A leased line network is formed. This customer A leased line network is formed between customers via provider edges (PE's) and provider core routers (PCR's) in the carrier network 6 and the customer edges (CE's) and the customer routers (CR's) in the customer networks 5. Contrary to this, the VPN service network of the present invention is constructed as follows.

Figure 3:
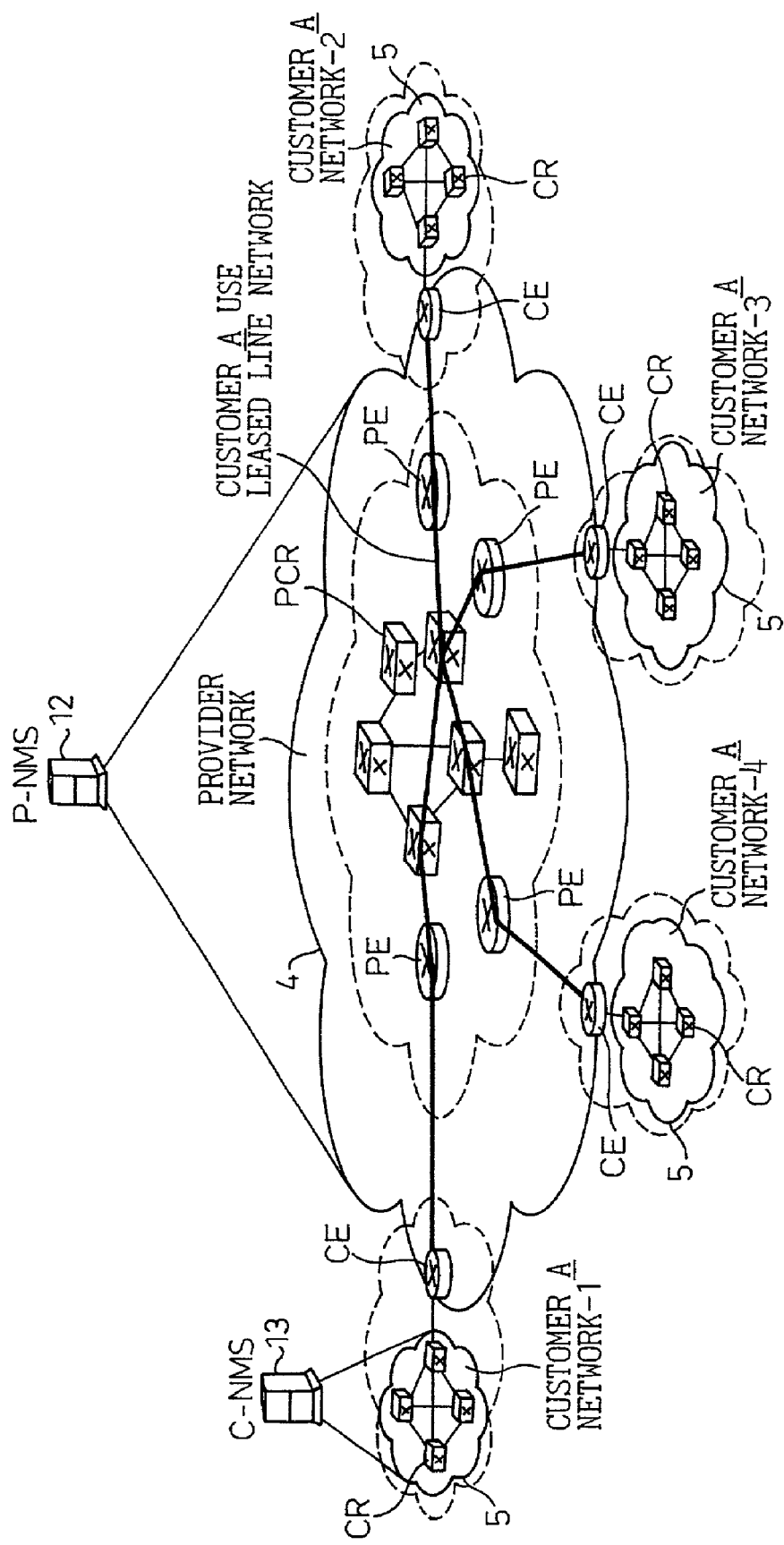
FIG. 3 is a view schematically showing a VPN service network formed by the present invention.

FIG. 3 is a view schematically showing a VPN service network formed by the present invention. It shows this based on the configuration of FIG. 2. Note that similar components are indicated by the same reference numerals or symbols throughout all of the figures.

When comparing FIG. 2 and FIG. 3, there is a difference between the two in the point that the customer edge (CE) under the management of each customer network 5 in FIG. 2 is also placed under the management of the carrier network side in FIG. 3. Namely, in the provider network 4 of the present invention, the original scope of management of the carrier network is extended up to the customer side. By this, it becomes possible to control the VPN service conditions through the customer edges. On the other hand, for this, on the provider side, an illustrated provider network management system (P-NMS) 12 becomes a useful managing means, while on the customer side, an illustrated customer network management system (C-NMS) 13 becomes a useful managing means. Note that, as little as one C-NMS is sufficient for the customer A networks 1, 2, 3, and 4.

According to the VPN service network shown in FIG. 3, the business merits shown in following [1] to [3] can be expected.

First, from the viewpoint of the provider side,

[1] A 24-hour monitoring service (outsourcing) of the customer VPN network including the customer edges (CE's) can be realized;

[2] Greater uniformity of the VPN service and the VPN service conditions thereof can be achieved and, as a result, it becomes unnecessary to deal with specifications differing for every vender model in the customer edges (CE's).

Also, from the viewpoint of the vender side, in addition to above [1] and [2],

[3] one vender can continuously supply customer edges (CE's), provider management system (P-NMS) and customer management system (C-NMS), unique to the vender, for one provider under contract with this provider.

A VPN service management system offering the business merits shown in the above [1], [2], and [3] will be explained next.

Figure 4:
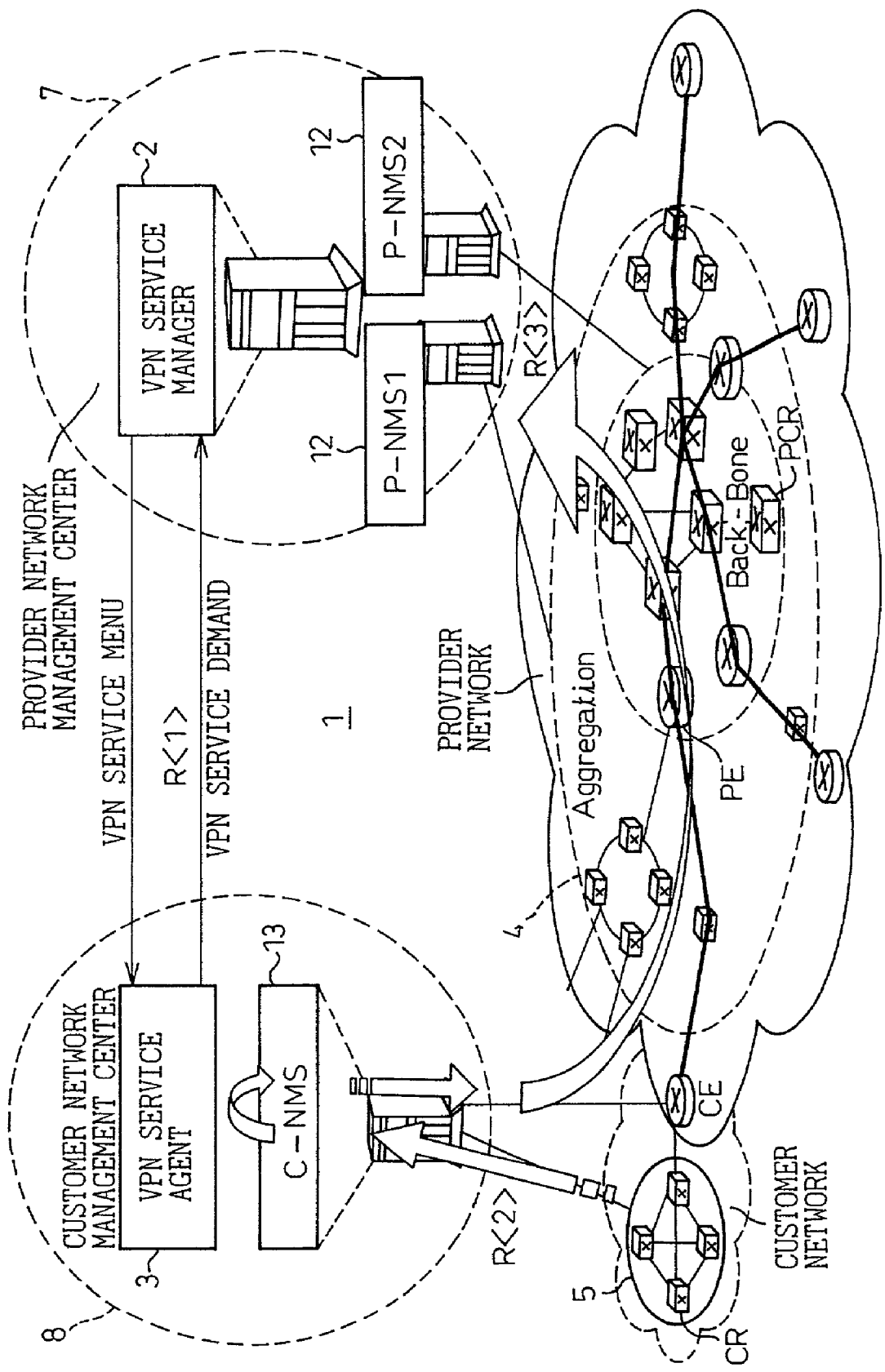
FIG. 4 is a view representing the entire VPN service management system according to the present invention.

FIG. 4 is a view of the overall VPN service management system according to the present invention. The figure shows the system configuration of FIG. 1 mentioned above as a reality-based concrete example.

In FIG. 4, the VPN service manager 2 shown in FIG. 1 is housed in a provider network management center 7. Also, the center 7 houses the provider network management system (P-NMS) 12 mentioned above. Note that, in the figure, as an example, two systems P-NMS1 and P-NMS2 are shown. This is for considering various business applications.

On the other hand, in FIG. 4, the VPN service agent 3 shown in FIG. 1 is housed in the customer network management center 8. Also, the center 8 houses the above mentioned customer network management system (C-NMS) 13.

The VPN service management system 1 according to the present invention is constructed by the above components, the provider network 4, and the customer network 5 working together.

The point which must be particularly noted in this VPN service management system 1 is that the following three requirements <1>, <2> and <3> can be satisfied. These three requirements could not be satisfied with the conventional VPN service.

Namely, according to the VPN service management system 1 of the present invention, the following requirements are satisfied:

<1> That the VPN service conditions (quality conditions or usage conditions of the VPN service) provided from the provider side can be instantly changed by the customer side (for example, corporate user side), <2> That the VPN service conditions can be easily changed in accordance with the traffic characteristics and the usage mode of the VPN in a customer network 5 automatically or by designating a time, and <3> That the settings of the VPN service conditions can be controlled by the customer (for example corporate user) by using the VPN contracted with the provider by the customer (by using for example an in-band communication mode).

Also, by satisfaction of the above three requirements <1>, <2> and <3>, it becomes possible to meet the three customer (for example, corporate user) side demands 1), 2), and 3) mentioned above. Namely, 1) Example of use at a company: A president of a company wishes to circulate New Year's greetings or announce a rough medium term plan to all members of all places of business at one time via a company intranet, 2) Example of use by ISP: The ISP wishes to double the bandwidths of its existing VPN's at one time for the start of the business of a new service, and 3) Example of use by ASP: The ASP wishes to prepare for a rush of applications when offering a Web ticket sale service, for example, only during a period of selling tickets for a popular group.

Referring to FIG. 4 again here, the flows of processing corresponding to the above requirements <1>, <2>, and <3> are shown as routes R<1>, R<2>, and R<3> in the figure.

In the route R<1>, the VPN service manager 2 provides a VPN service menu to the VPN service agent 3. This menu displays the various types of the VPN service which can be provided to the customers.

Also, in the route R<1>, the VPN service agent 3 considers the state of use of the VPN's of the customer networks 5 under it and refers to the menu to request the desired VPN service to the VPN service manager 2.

In the route R<2>, the VPN service agent 3 collects information concerning the traffic characteristics and the usage mode of the VPN's in the subordinate customer networks 5 via the C-NMS 13 and generates an illustrated VPN service demand in the route R<1>.

In the route R<3>, the collected information concerning the traffic characteristics and usage mode of the VPN's is actually reflected at the provider side. Namely, the information is transmitted to the provider side. This transmission is achieved from the C-NMS 13 through the customer edges (CE) by using VPN's in contract under the in-band mode.

First Embodiment

Details of the VPN service management system 1 satisfying the above requirements <1>, <2>, and <3> will be concretely explained next.

Figure 5:
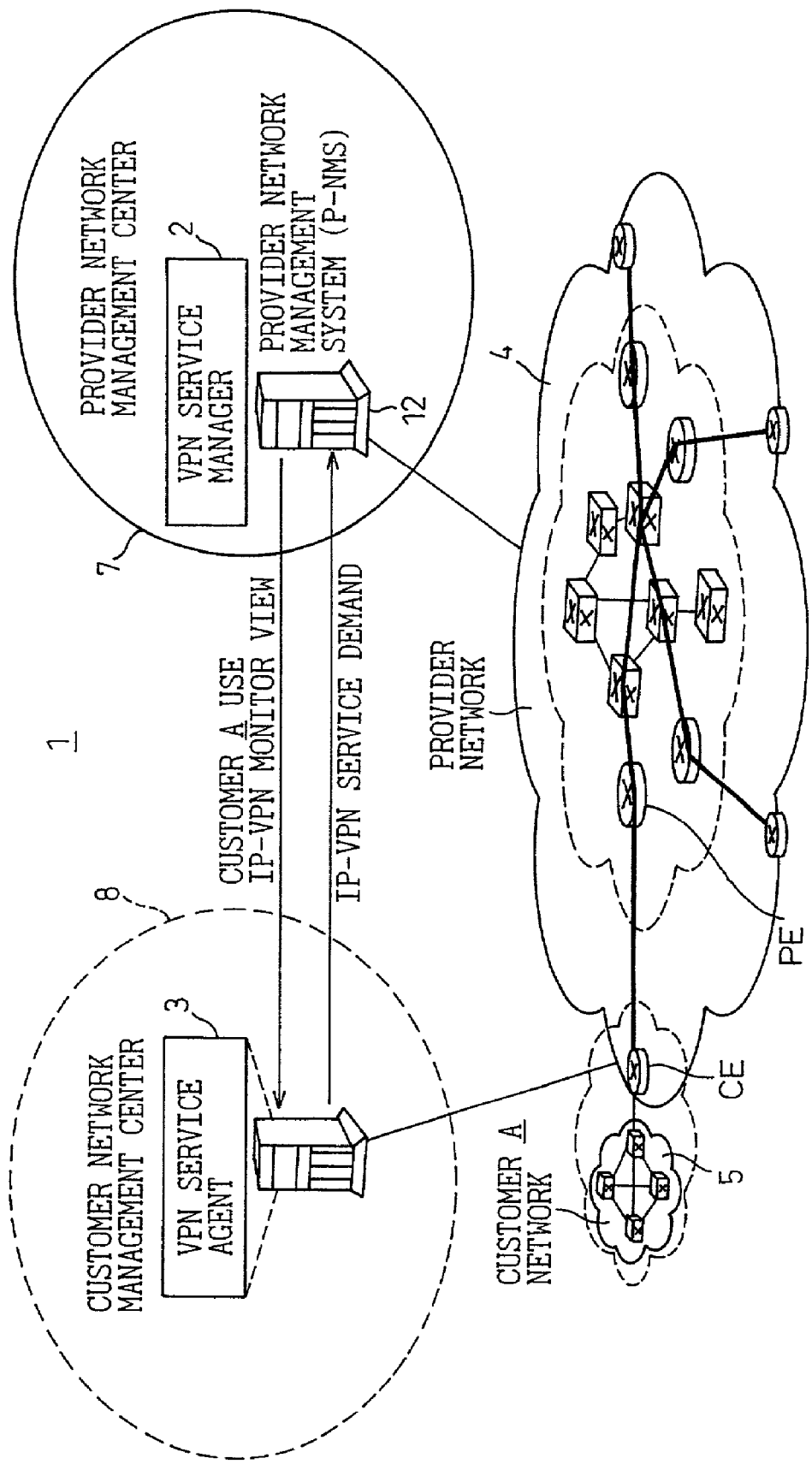
FIG. 5 is a view of the basic configuration of a VPN service management system 1 according to the present invention.

FIG. 5 is a view of the fundamental configuration of the VPN service management system 1 according to the present invention. Accordingly, most of the configuration of the figure is included in the configuration of FIG. 4.

The parts of the configuration which should be noted in the figure are as follows.

The system 1 further has a provider network management system (P-NMS) 12 cooperating with the VPN service manager 2 on the provider side. This provider network management system 12 manages the provider network 4 including also the customer edges (CE's) arranged in the customer networks 5 for connection with the provider network 4.

The system 1 may be provided with, at least, the provider network management system (P-NMS) 12 in addition to the VPN service manager 2 and the VPN service agent 3. In order to further impart various functions, however, preferably the above mentioned customer network management system (C-NMS) 13 is disposed, although it is not shown in FIG. 5. Namely, the system 1 further has a customer network management system (C-NMS) 13 cooperating with the VPN service agent 3 and managing the customer network 5 on the customer side. This customer network management system 13 monitors the customer edges (CE's) and communicates with the provider network 4 side.

According to the example of FIG. 5, the VPN service manager 2 provides the customer A with an IP-VPN monitor view for the customer A network as the above mentioned VPN service menu. The customer A makes a request for the desired IP-VPN service via the VPN service agent 3 to the provider side according to this IP-VPN monitor view. Note that, in the figure, illustration of other customer A networks (refer to FIG. 3) linked with this customer A network is omitted. A network configuration wherein, if for example the illustrated customer A network is located in Tokyo, the other customer A networks are located in Hokkaido, Nagoya, Osaka, Kyushu, etc. is considered. The configuration of FIG. 5 will be further concretely explained next.

Figure 6:
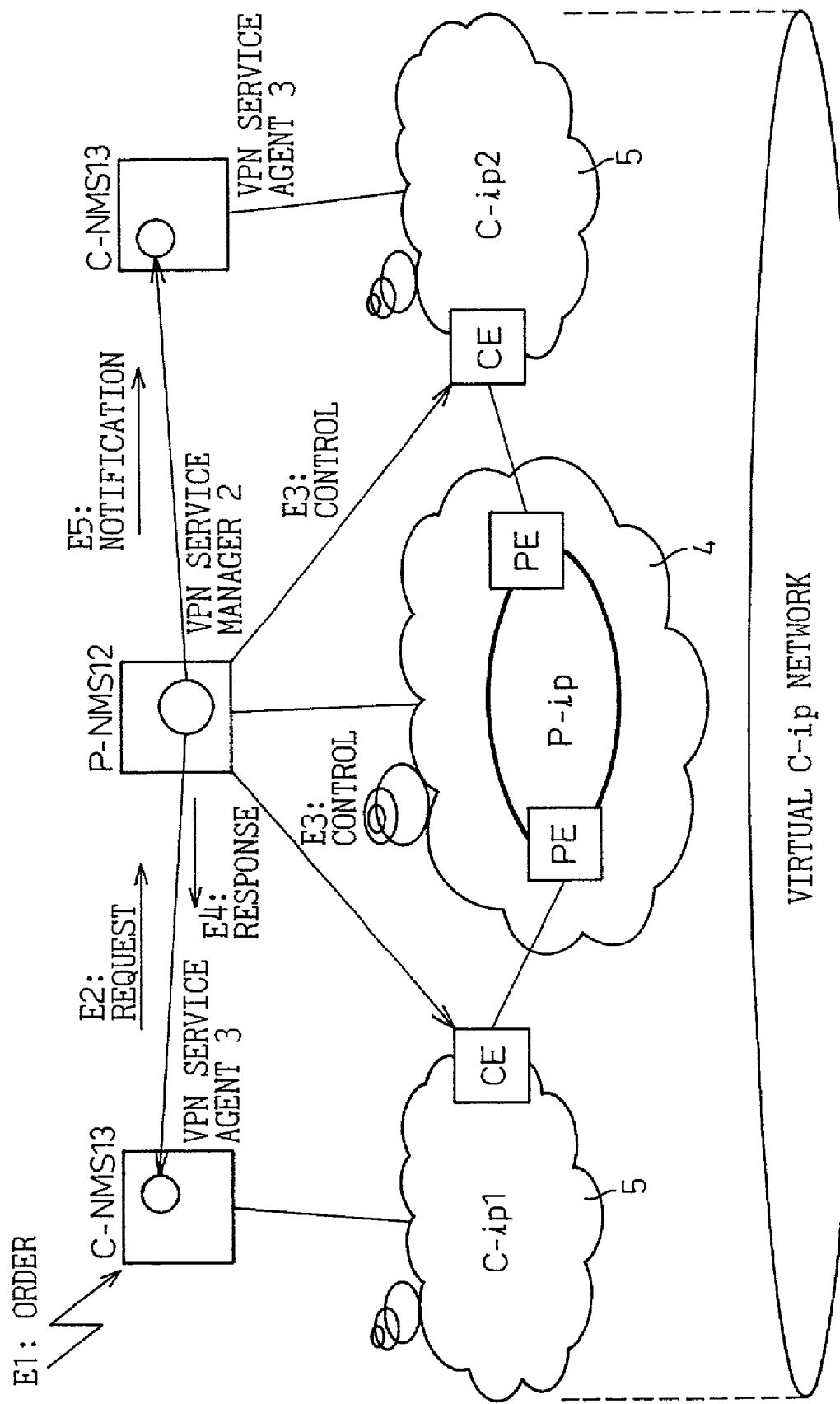
FIG. 6 is a view of the configuration of FIG. 5 using a concrete example.

FIG. 6 is a view of a concrete example of the configuration of FIG. 5.

The schematic configuration of the figure will be explained next. Note that, in the figure, E1, E2, E3, . . . represent various types of events. These events will be explained in detail by referring to FIG. 10 and FIG. 11 mentioned later.

In FIG. 6, P-ip is the provider side IP network of the VPN service. C-ip1 and C-ip2 are IP networks of the customer side of the VPN service and are connected to P-ip. This P-ip has connected to a plurality of customer side IP networks of the VPN service. Here, a "VPN service" means a service based on existing technology wherein a provider side IP network relays information among a plurality of partial customer IP networks without processing so as to realize a single virtual customer IP network overall comprised of the customer IP networks.

The customer edges (CE's) are the customer side IP apparatuses of the VPN service for connecting the customer IP networks of the VPN service and the provider IP network of the VPN service. Also, "PE" shows a provider side IP apparatus of the VPN service connected to a customer edge (CE).

The provider network management system P-NMS12 is a provider side IP apparatus which monitors and controls the IP network. This P-NMS12 monitors and controls the operation status of the provider IP apparatus and the IP network.

The customer network management system C-NMS12 is a customer side IP apparatus which monitors and controls the IP network. This C-NMS12 monitors and controls the operation status of that customer IP network.

Any numbers of these P-NMS12 and C-NMS12 may be disposed according to the scale of the IP apparatuses and IP networks to be managed, the geographic conditions, operation conditions, etc. . . . Here, each C-NMS12 can monitor and control a customer edge (CE), while the P-NMS12 can monitor and control customer edges (CE) through the C-NMS12's or through the provider side IP apparatuses (PE).

In the present invention, a VPN service manager 2 able to control the VPN service for the customer edges (CE) disposed on the C-ip network is provided in the P-NMS12.

Also, a VPN service agent 3 for enabling a customer side VPN service operator to remotely control the VPN service manager 2 is provided in each C-NMS12.

The VPN service manager 2 and each VPN service agent 3 cooperate by the interposition of a VPN service condition table between them. This table will be explained below.

Figure 7:
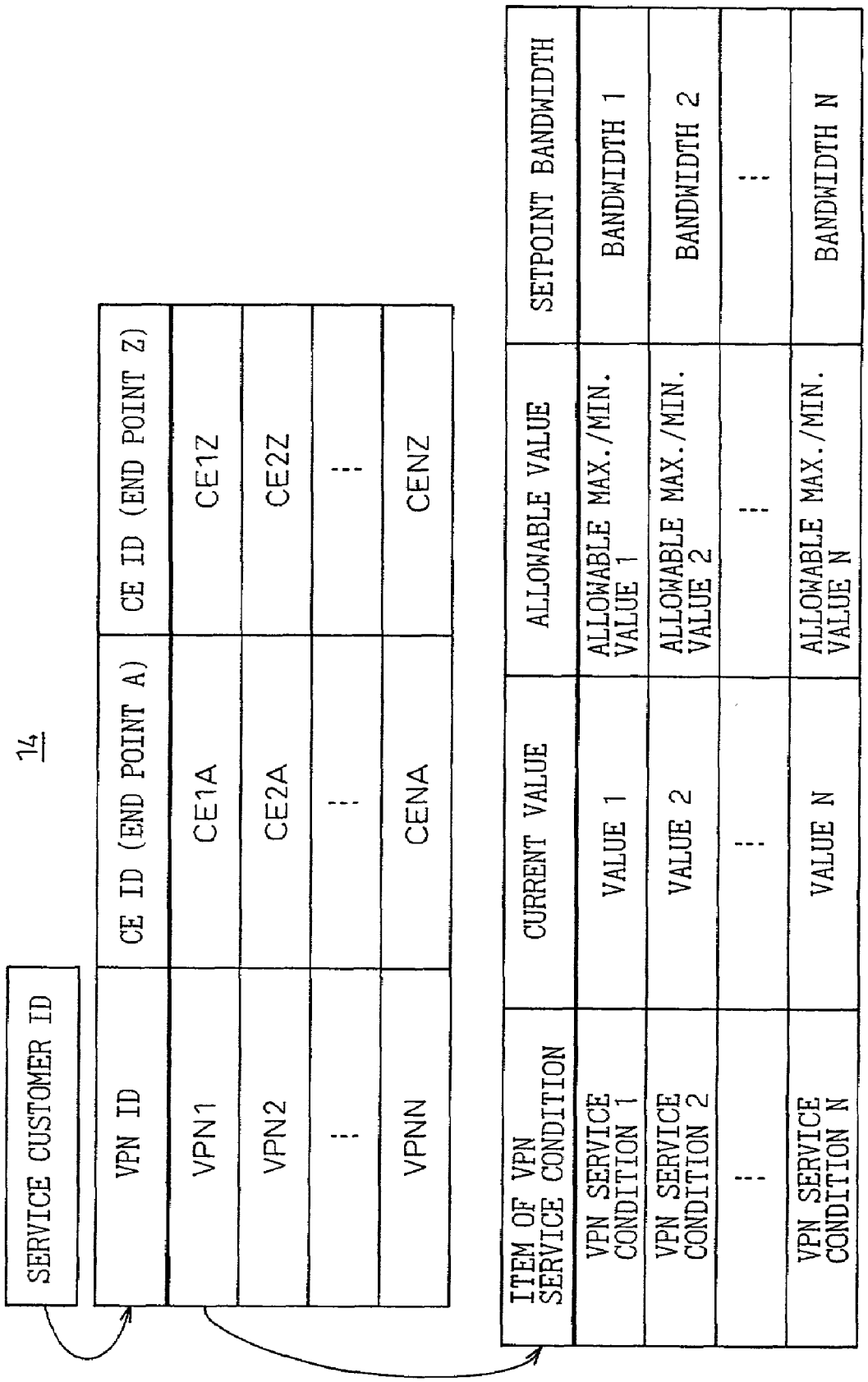
FIG. 7 is a view schematically representing a VPN service condition table.

FIG. 7 is a view schematically showing the VPN service condition table.

The VPN service manager 2 provides a service menu concerning the VPN service as the VPN service condition table 14 in the figure to the VPN service agent 3. When there is a request for change of the VPN service conditions on the customer side, the VPN service agent 3 transmits the request for change to the VPN service manager 2 via that service menu. The VPN service manager 2 then reflects the request for change in the provider network 4 via the provider network management system 12.

For example, this VPN service condition table 14 is arranged in the P-ip network or the P-NMS12 of FIG. 6. This VPN service condition table 14 holds identifiers of the VPN service customers and VPN identifiers allocated to the concerned customers, CE identifiers for identifying the customer edges CE of the two end points (end point A to end point Z) of the VPN and arranged at the target customers, a list of VPN service condition items which can be changed by the VPN service customers, current values set, at present, in correspondence with the items of the VPN service conditions, and allowable maximum/minimum values allowed as the VPN service condition values and setpoint bandwidths (bandwidths to be used) thereof. Sometimes items of the VPN service conditions and the range of allowable values are stipulated in the VPN service contract between the customer and the provider, while other times items of the VPN service conditions are added or deleted in accordance with the situation of the VPN service or the state of the IP network. Note that these VPN service condition items sometimes differ for different technical specifications for realizing the VPN service. Explaining this further, at times of a major disaster, it becomes impossible to stipulate a guaranteed band. The VPN service condition stipulating the bandwidth may be deleted or, conversely, a VPN service condition that a leased line such as a wireless or satellite channel be used to enable bandwidth to be secured with priority, that is, routing through a leased line, can be added.

By interposing the VPN service condition table 14 as described above, the VPN service manager 2 and the VPN service agents 3 can cooperate with each other. The means (functions) which must be provided in the VPN service manager 2 and VPN service agents 3 for this cooperation will be explained next.

Figure 8:
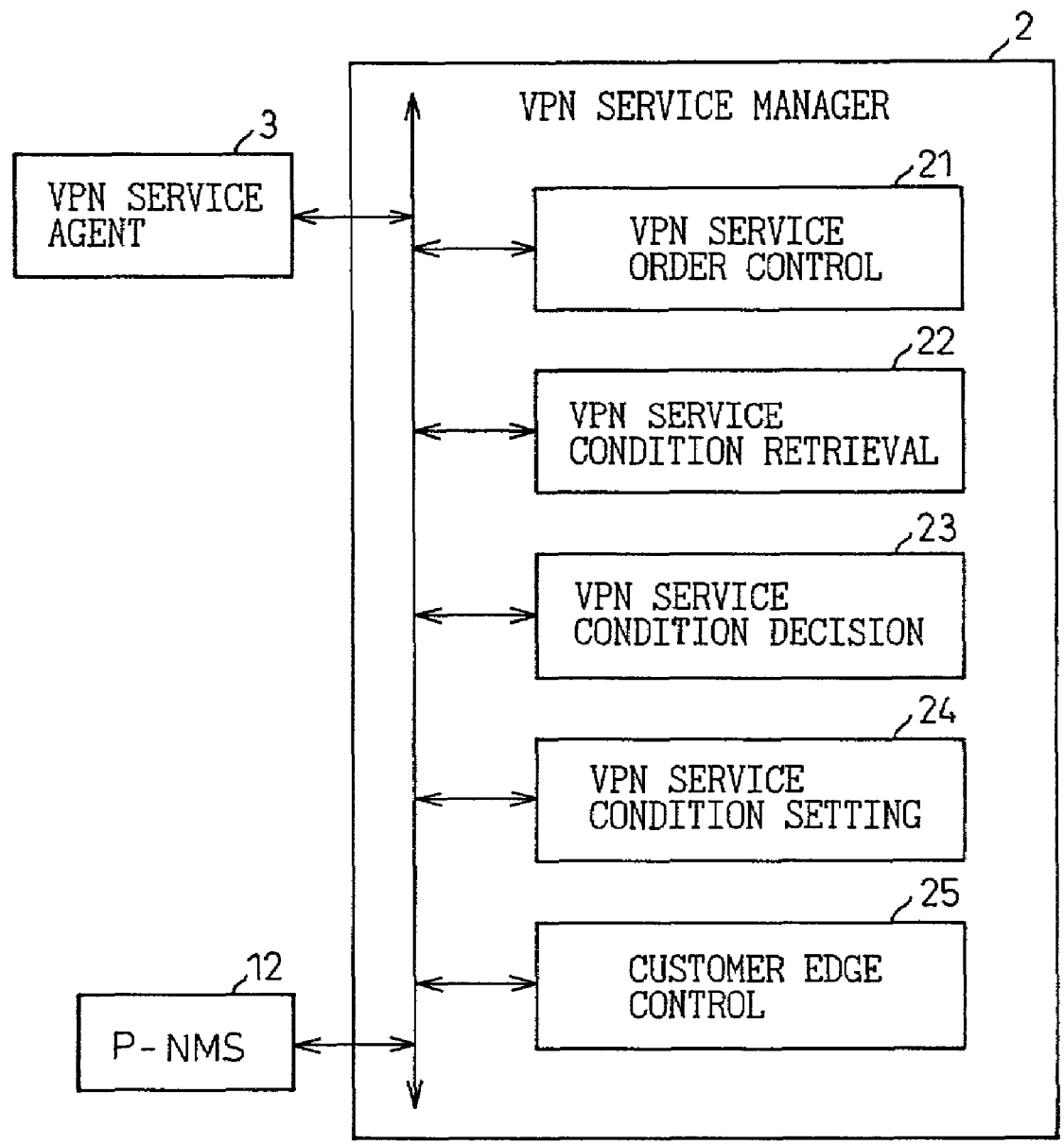
FIG. 8 is a view of the functions provided in a VPN service manager 2.
Figure 9:
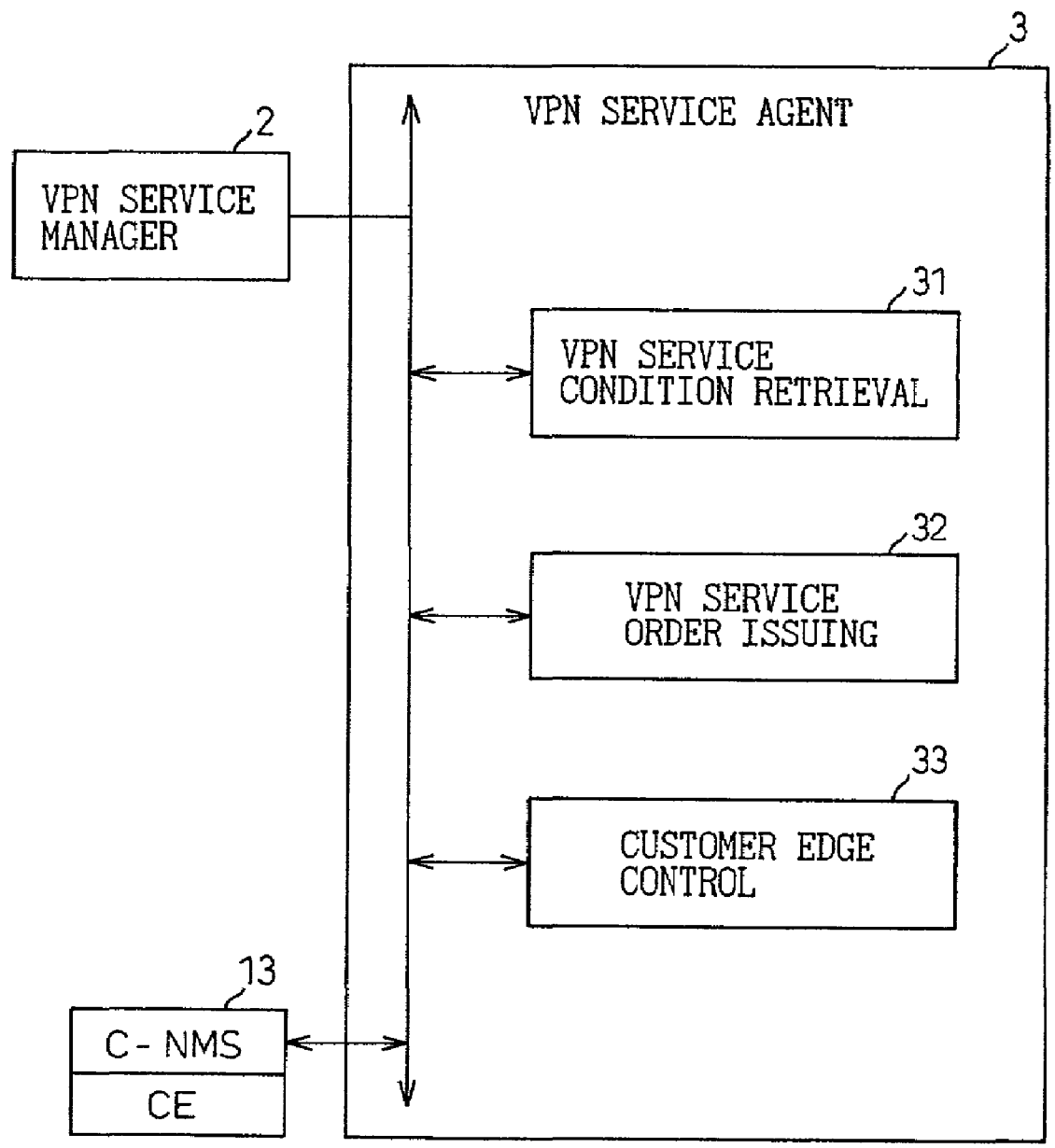
FIG. 9 is a view of the functions provided in a VPN service agent 3.

FIG. 8 is a view of the functions provided in the VPN service manager 2, while FIG. 9 is a view of the function provided in the VPN service agents 3.

Referring to FIG. 8, the VPN service manager 2 is provided with a VPN service order control means 21 for receiving an order when an order for changing the VPN service conditions (FIG. 7) is generated from a VPN service agent 3 and outputting the changed VPN service conditions concerned in that order, a VPN service condition retrieval means 22 for retrieving the present VPN service conditions given to the concerned customer network 5 from the VPN service condition table (FIG. 7) when that order is generated, a VPN service condition decision means 23 for deciding whether or not the range by which the changed VPN service conditions exceed the present VPN service conditions is within an allowable range, a VPN service condition setting means 24 for resetting the present VPN service conditions to the changed VPN service conditions when the result of said decision is "POSSIBLE", and a customer edge control means 25 for controlling the customer edge (CE) based on the reset VPN service conditions.

By this means 25, the provider side VPN service operator becomes able to control the VPN service at the customer edge (CE).

Further supplementing the explanation, the VPN service order control means 21 receives an order for changing the VPN service conditions (VPN service order) from a VPN service agent 3. Based on the customer identifier and the VPN identifier contained in the concerned order, individual VPN service conditions and values similarly contained in the concerned order are transferred to the VPN service condition decision means 23.

When the result of decision by the service condition decision means 23 is "POSSIBLE", the VPN service condition setting means 24 is used to change the present values of the VPN service condition table 14.

Thereafter, the VPN service conditions and values are converted to control information corresponding to the customer edge (CE), then the control information is transmitted to the CE control means 25. Further, based on the result of decision by the VPN service condition decision means 23 and the result of the control by the CE control means 25, the result is sent back to the VPN service agent 3.

The VPN service condition retrieval means 22 extracts the contents of the VPN service condition table 14 for the customer identifier and the VPN identifier.

The VPN service condition decision means 23 confirms for each of the individual VPN service conditions and values thereof contained in the VPN service condition change order whether or not the VPN service condition table 14 has the corresponding VPN service condition and whether or not the corresponding value is within the allowable values based on the customer identifier and VPN identifier.

The VPN service condition setting means 24 sets the values contained in the VPN service order as the present values for the individual VPN service condition items based on the customer identifier and the VPN identifier.

Referring to FIG. 9 next, each VPN service agent 3 is provided with a VPN service condition retrieval means 31 for retrieving the current VPN service conditions given to a concerned customer network 5 from the VPN service condition table (FIG. 7) when an order for changing the VPN service conditions is generated from a customer and a VPN service order issuing means 32 for issuing the order to the VPN service manager 2 based on the retrieved VPN service conditions.

Also, the VPN service agent 3 is provided with a customer edge control means 33 for controlling the customer edge (CE) based on the VPN service conditions reset by the VPN service manager 2 upon receipt of the order when the VPN service manager 2 controls the customer edge (CE) through the VPN service agent 3.

Note that a group of functions for collecting IP network information for issuing a change of VPN service conditions (VPN service order) such as monitoring for faults and monitoring traffic of the C-ip network (FIG. 6) is arranged in the C-NMS12.

Further supplementing the explanation, the VPN service order issuing means 32 issues an order for changing the values of the individual VPN service conditions to the VPN service manager 3 based on the IP network information obtained from the C-NMS12.

The customer edge control means 33 controls the functions relating to the VPN service provided in the customer edge (CE).

Returning to FIG. 6 again, the above mentioned events E1, E2, E3, . . . will be explained in the form of a control sequence based on the explanation given with reference to FIG. 7, FIG. 8, and FIG. 9.

Figure 10:
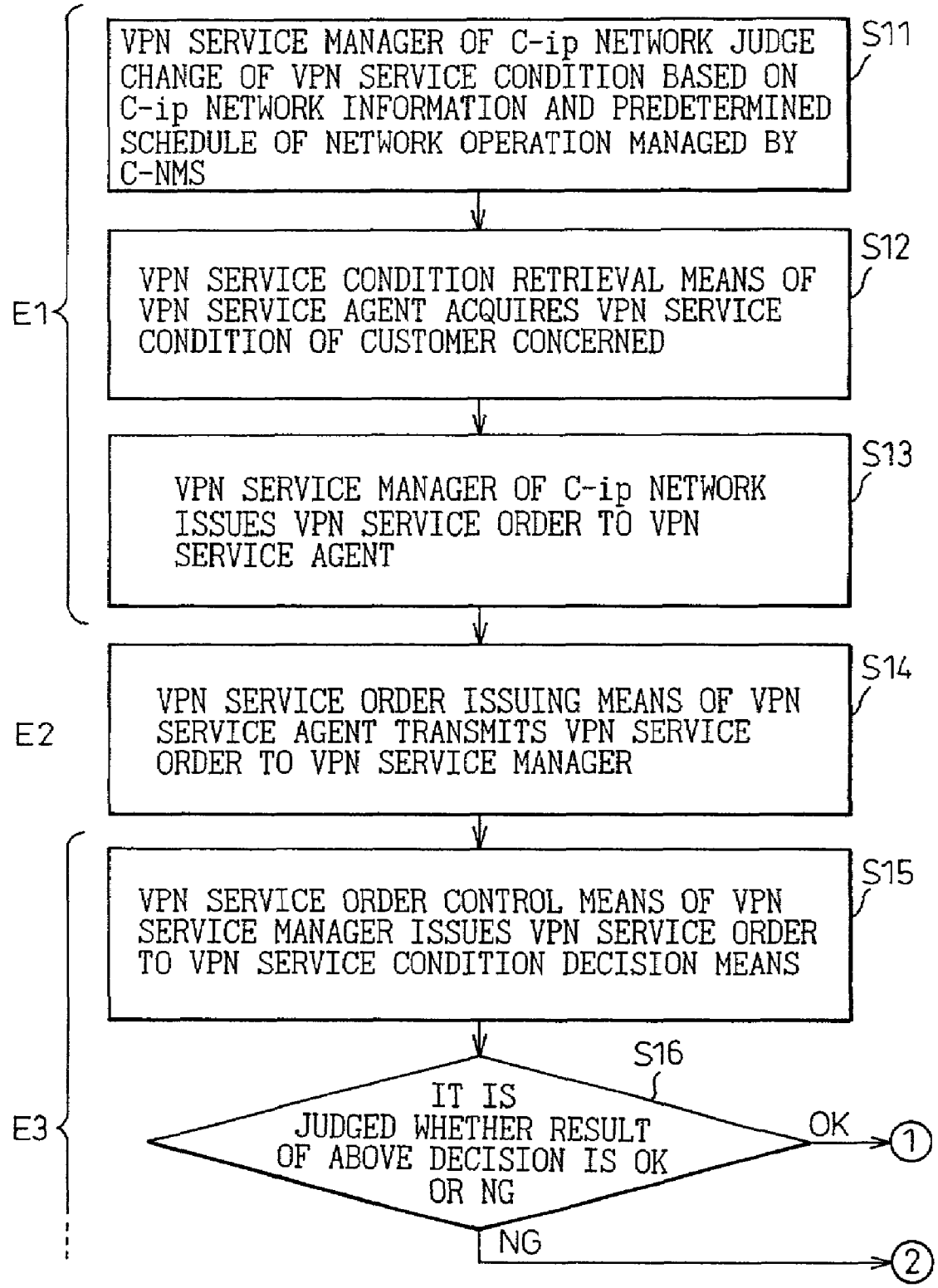
FIG. 10 is a first part of a flow chart for explaining a control sequence in FIG. 6.
Figure 11:
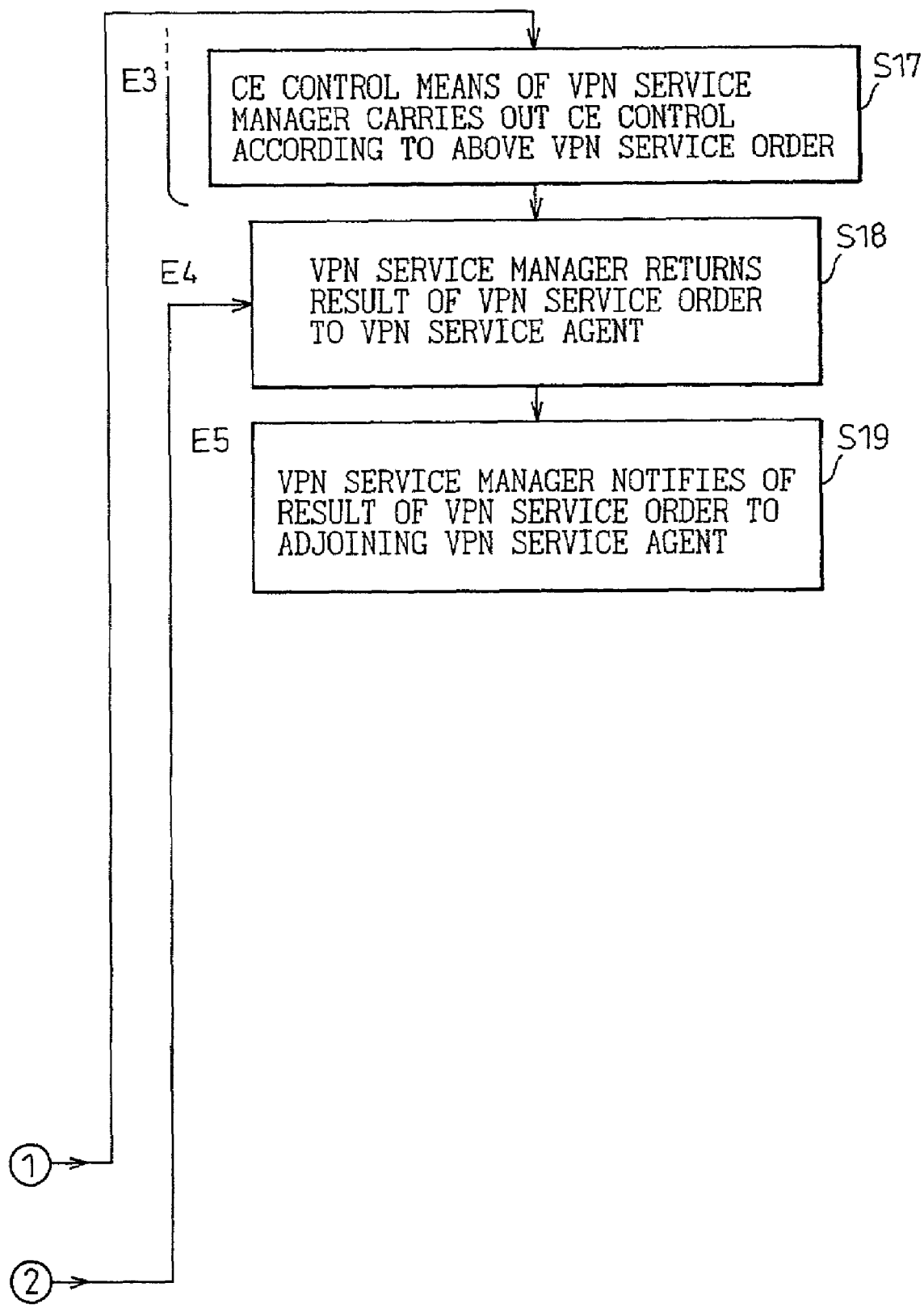
FIG. 11 is a second part of a flow chart for explaining the control sequence in FIG. 6.

FIG. 10 and FIG. 11 are parts of a flow chart for explaining the control sequence in FIG. 6.

First, the correspondence between the steps (S11 to S19) of FIG. 10 and FIG. 11 and the events (E1 to E5) of FIG. 6 becomes as follows:

E1: S11, S12, and S13
E2: S14
E3: S15, S16, and S17
E4: S18
E5: S19

Steps S11 to S19 are as follows.

Step S11: The VPN service manager of the C-ip network judges the change of the VPN service conditions from the C-ip network information of the C-NMS12 and the predetermined network operation schedule.

Step S12: The VPN service condition retrieval means 31 of the VPN service agent 3 acquires the VPN service conditions of the concerned customer.

Step S13: The VPN service manager of the C-ip network issues a VPN service order to the VPN service agent 3.

Step S14: The VPN service order issuing means 32 of the VPN service agent 3 transmits the VPN service order to the VPN service manager 2.

Step S15: The VPN service order control means 21 of the VPN service manager 2 issues the VPN service order to the VPN service condition decision means 23.

Step S16: It is decided whether the result of the decision is "POSSIBLE" (OK) or "IMPOSSIBLE" (NG).

Step S17: The CE control means 25 of the VPN service manager 2 controls the customer edge (CE) based on the VPN service order.

Step S18: The VPN service manager 2 sends back the result of the VPN service order to the VPN service agent 3.

Step S19: The VPN service manager 2 notifies the result of the VPN service order to the adjoining VPN service agent 3.

By the above configurations (FIG. 7, FIG. 8, and FIG. 9) and the control sequences (FIG. 10 and FIG. 11), the VPN service operator of the customer side IP network becomes able to change the VPN service conditions freely and dynamically without going through the VPN service operator of the provider side IP network. This means that the VPN service operator of the VPN service customer side can efficiently operate the customer IP network on a timely basis based on the usage situation and predictions of the virtual customer IP network as a whole.

Figure 12:
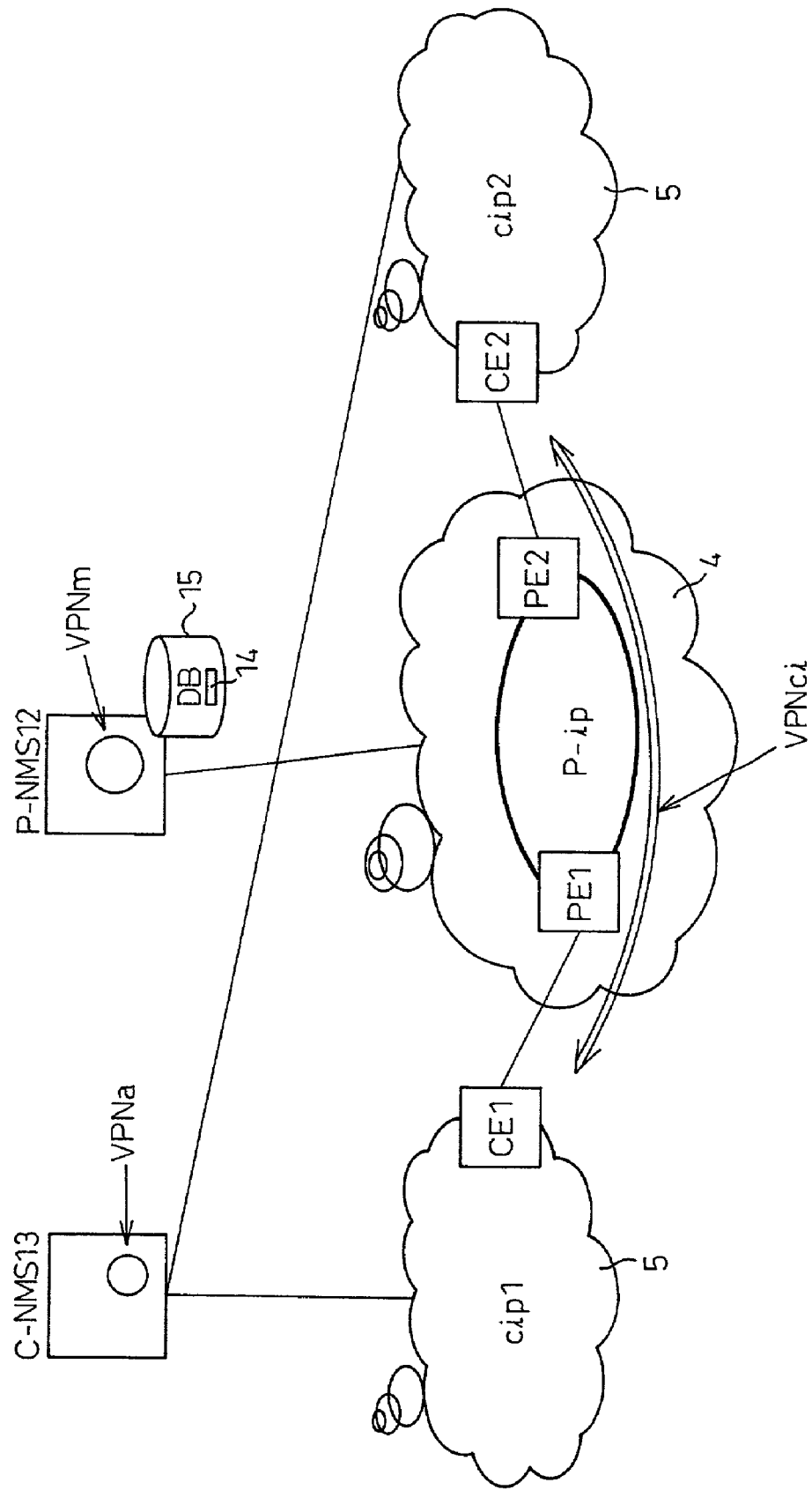
FIG. 12 is a view of an example of application of the present invention.
Figure 13:
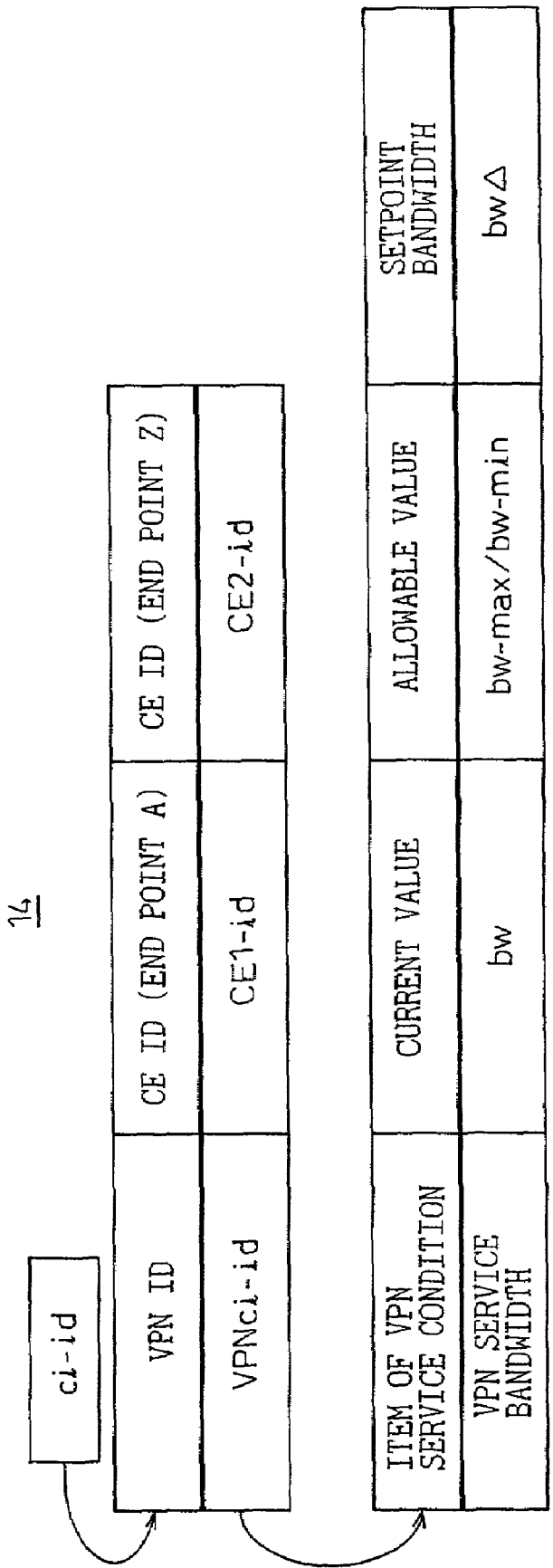
FIG. 13 is a view of contents of a VPN service condition table 14 used in the example of application of FIG. 12.

FIG. 12 is a view of an example of application of the present invention, while FIG. 13 is a view of the contents of the VPN service condition table 14 used in the example of application of FIG. 12.

Note that FIG. 12 should be viewed in substantially the same way as FIG. 6, and FIG. 13 is a detailed example of the VPN service condition table 14 shown in FIG. 7. The table 14 is formed in the database (DB) 15 of FIG. 12.

An example of application of the present invention will be explained by referring to FIG. 12 and FIG. 13.

A certain customer, that is, a company ci offering a Web ticket sale service, has two customer IP networks cip1 and cip2 monitored and controlled by a single customer network management system C-NMS12. A VPN service is provided between the cip1 and cip2 by the provider IP network P-ip.

At this time, the customer edges are CE1 and CE2, the provider edges are PE1 and PE2, and the provided VPN is a VPNci reaching CE2 from CE1 via PE1 and PE2. Also, an example is shown wherein the database (DB) 15 for storing the VPN service condition table 14 is disposed in the P-NMS12.

As the VPN service condition with respect to this VPNci provided to the company ci, the bandwidth of the VPN service can be freely changed. The current value of that bandwidth, maximum value, minimum value, and the setpoint bandwidth are bw-i, bw-max, bw-min, and bwA (bw: bandwidth) as shown in FIG. 13. The customer identifier and VPN identifier of the company ci in this case are ci-id and VPNci-id, while the CE identifiers of the two end points (A, Z) of the VPNci, that is, CE1 and CE2, are CE1-id and CE2-id.

Note that, in order to realize the VPN service, other than what is described above, there is a lower rank network technology for realizing VPN links between CE1 and PE1, between PE1 and PE2, and between PE2 and CE2 and VPN.

Here, during the ticket sale period, orders from persons who desire to purchase tickets rush in. Therefore, the amount of accesses to the VPNci (that is, between cip1 and cip2) suddenly increases. For this reason, the VPN service conditions will be rapidly changed. The control in this case becomes as follows.

1. The VPN service manager of the VPNci decides that a change of the VPN service bandwidth is necessary at the start of the ticket sales.

2. The VPN service manager acquires the VPN service conditions (VPN service bandwidth) of the VPNci from the database (DB) 15 by the VPN service condition retrieval means 31 of the VPN service agent (VPNa) 3 and determines that the bandwidth bw should be increased by exactly bw'.

3. The VPN service manager issues an order for changing the VPN service bandwidth corresponding to the customer identifier ci and the VPN identifier VPNci-id from bw to bw' to the service agent (VPNa) 3.

4. The VPN service order issuing means 32 of that service agent VPNa transmits that order to the VPN service manager (VPNm) 2.

5. The VPN service order control means 21 of this service manager VPNm issues the concerned order to the VPN service condition decision means 23.

6. This VPN service condition decision means 23 evaluates whether or not the changed bandwidth bw' contained in that order satisfies the following conditions with respect to bw-max and bw-min in the database 15.

bw-min<bw'<bw-max

The VPN service condition decision means 23 returns the result of the decision "OK" for that order if the above conditions are satisfied, but will return the result of the decision "NG" if the above conditions are not satisfied (step S16 of FIG. 7).

7. When the result of the decision received from the VPN service condition decision means 23 is "OK", the VPN service order control means 21 issues the concerned order to the VPN service condition setting means 24, but when the result of the decision received from the VPN service condition decision means 23 is "NG", it responds that the order has failed to the agent VPNa and the present control is terminated.

8. The VPN service condition setting means 24 changes the present value of the VPN service bandwidth as the service condition imparted to VPNci from bw to bw'.

9. Further, the VPN service order control means 21 controls CE1 and CE2 to change bw to bw' by using the CE control means 25 when the result of the decision at the above 7. is "OK".

10. The VPN service order control means 21 returns the result of control of the CE1 and CE2 at the above 9. as a response to the agent VPNa.

11. At the end of the ticket sale, control is performed so that the order becomes bw at the above 2. to 10. to change the VPN service bandwidth from bw' to the original bw again.

Due to the above, during the ticket sale period by the company ci, it is possible to increase the VPN service bandwidth of the VPNci so as to deal with the rush in access by persons who desire to purchase tickets.

Figure 14:
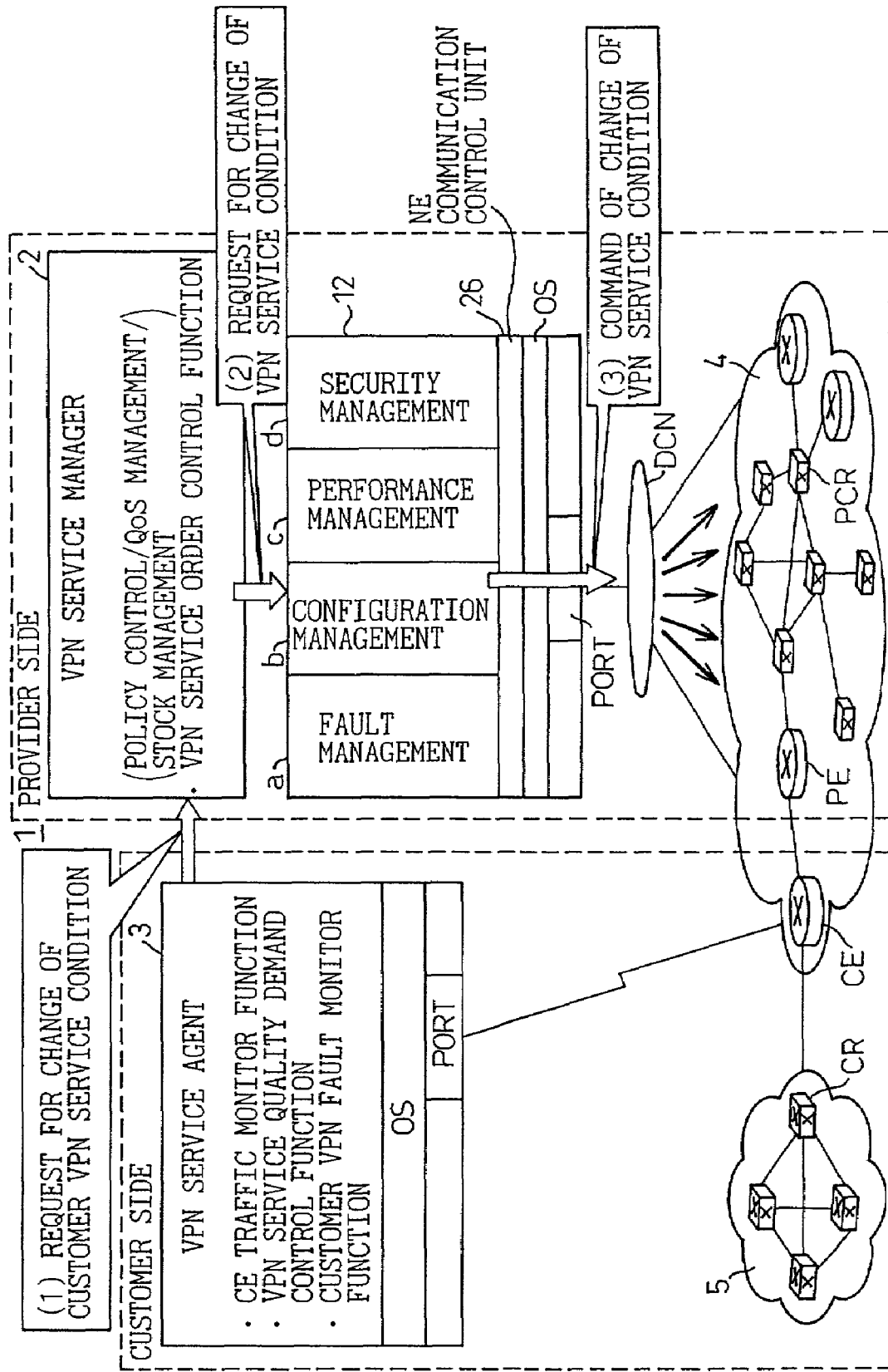
FIG. 14 is a first part of a view of a concrete image of the VPN service management system shown in FIG.
Figure 15:
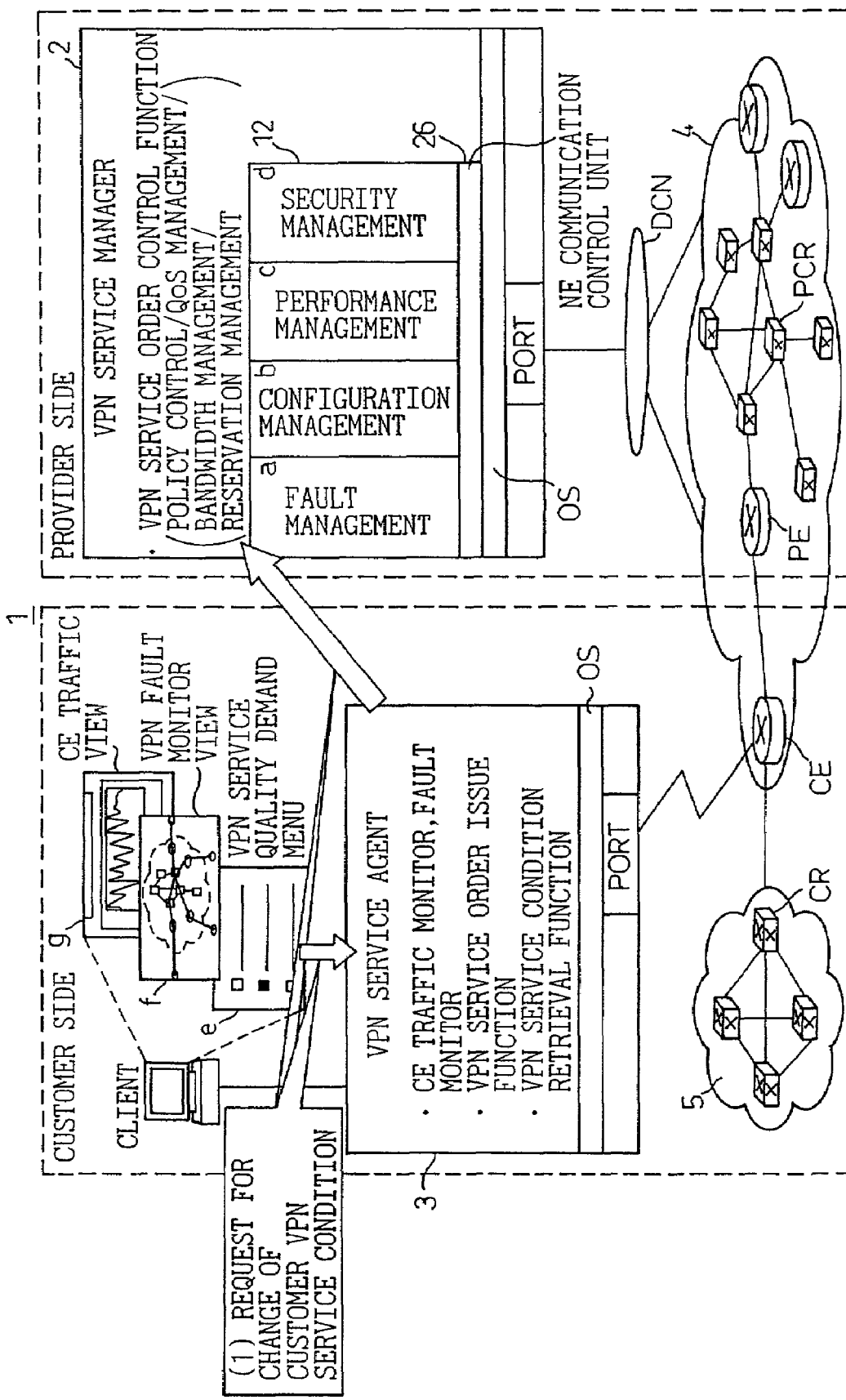
FIG. 15 is a second part of a view of a concrete image of the VPN service management system shown in FIG.

A concrete image of the system shown in FIG. 1 will be shown next supplementarily by using the figures. FIG. 14 and FIG. 15 are parts of a view of a concrete image of the VPN service management system shown in FIG. 1.

In FIG. 14, the right side (provider side) and left side (customer side) show the VPN service manager 2 and a VPN service agent 3 of the VPN service management system 1.

As the main function of the VPN service manager 2, the VPN service order control function (refer to means 21 of FIG. 8) is shown. As the original operation for achieving this function, the VPN service manager 2 performs the illustrated policy control, QoS (Quality of Service) management, stock management, etc. "Stock management" means so-called "resource management" for deciding whether or not a demand for increase can be accepted when receiving a demand to suddenly increase the bandwidth, for example, to 100 Mbps from a customer operating with a bandwidth of 10 Mbps at present.

Also, the provider network management system (P-NMS) 12 cooperating with that VPN service manager 2 has at least the illustrated units for management of faults (a), configuration (b), performance (c), and security (d). The VPN service manager 2 controls network elements (NE) such as the PE's, CE's, and PCR's in the subordinate provider network 4 via the NE communication control unit 26 and corresponding ports under the operating system (OS) in the system (P-NMS) 12 based on the management data by these management units a to d.

The fault management unit a watches constantly faults occurring in the provider network 4.

The configuration management unit b watches constantly what kind of network elements (NE) the provider network 4 is configured by.

The performance management unit c constantly monitors the traffic information and amount of generation of packet loss in the network elements.

Also, the security management unit d makes security checks by passwords and authentication.

On the other hand, the main functions of the VPN service agent 3 provided at the left side (customer side) of FIG. 14 are shown as a function of monitoring the traffic of the customer edge (CE), a function of controlling requests for quality of VPN service, and a function of monitoring faults at the customer VPN. The customer edge CE is monitored via the corresponding port under the operating system (OS).

The processing in the VPN service management system 1 shown in FIG. 14 may be roughly classified to following processing (1), (2), and (3). Note that, (1), (2), and (3) are shown also in FIG. 14.

(1) For example, when the president of a company, that is, the customer A, wishes to broadcast a management plan to all employees at all places of business of the company all together through the customer A networks 1, 2, 3, and 4 of FIG. 3, the concerned VPN service agent 3 requests a change of the customer VPN service conditions at the VPN service manager 2. That is, it requests a temporary increase of the bandwidth (bw).

(2) The VPN service manager 2 receiving that request requests a change of the VPN service conditions at the subordinate provider network management system (P-NMS) 12.

(3) The provider network management system 12 receiving that request sends a command indicating that "the VPN service conditions be changed" to the network elements (NE) in the subordinate provider network 4.

Next, refer to FIG. 15. The figure shows a more realistic image of the configuration of FIG. 14.

In FIG. 15, the VPN service agent 3 is shown as having the function of issuing a VPN service order (refer to the means 32 of FIG. 9) and a function of retrieving the VPN service conditions (refer to the means 31 of FIG. 9).

e shown at the top left of the figure is the VPN service quality demand menu. This menu e is the menu for specifying the service for which provision is sought from the customer side from the list of services which can be provided by the manager 2 presented from the VPN service manager 2 and returning it to the manager 2.

Further, g is the CE traffic view for checking the change in traffic over time at the customer edge (CE) on the customer side. By referring to this traffic view g, the operation manager of the customer side can determine the present situation of the used bandwidth.

Also, f is a view for visually displaying the VPN of the customer to the operation manager as topology. This view f is in practice the VPN fault monitor view utilized for monitoring faults of the VPN.

Second Embodiment

Next, an explanation will be made of full automation of VPN service management in the VPN service management system 1 according to the present invention.

Figure 16:
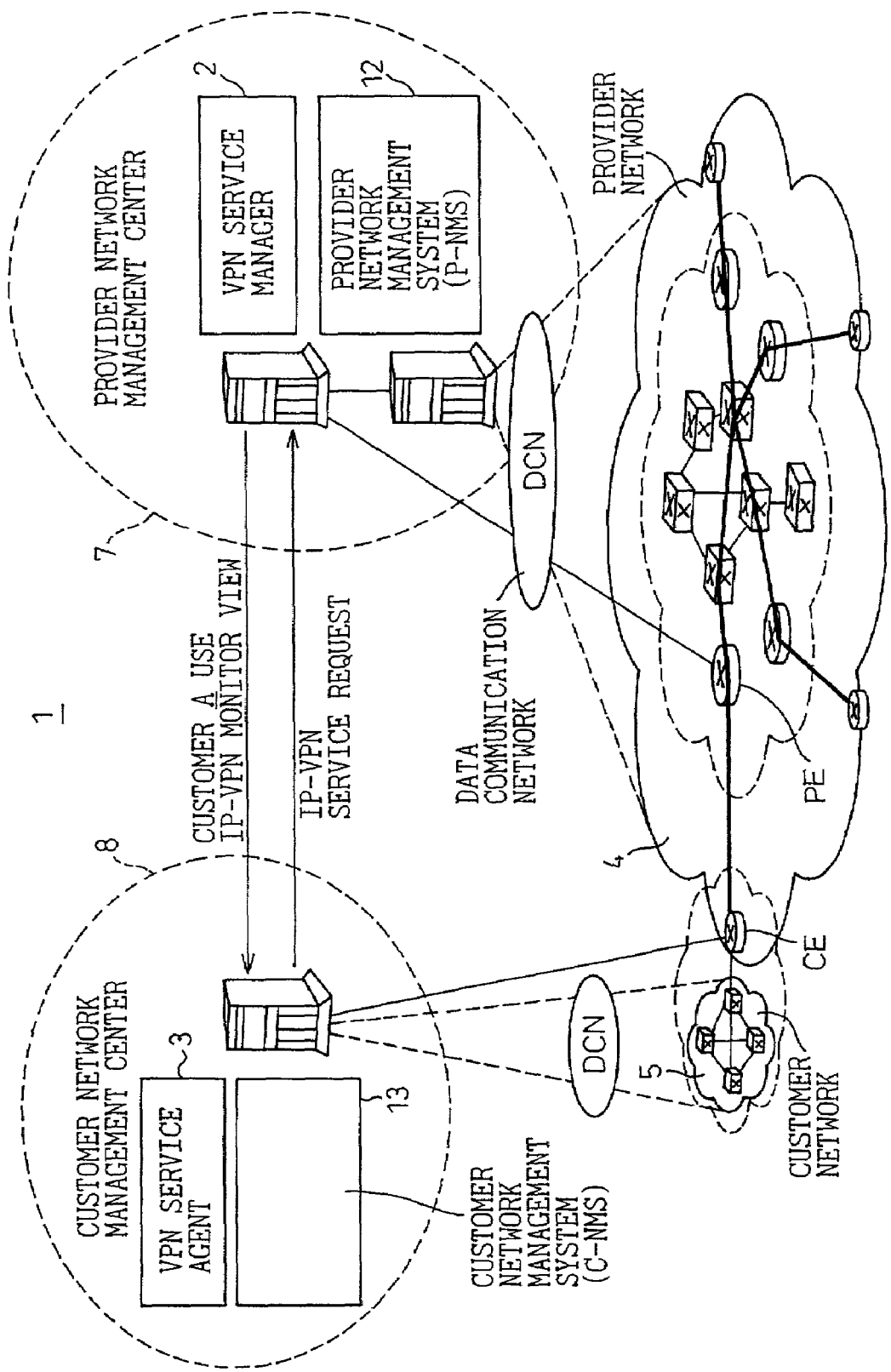
FIG. 16 is a view of the VPN service management system 1 for explaining a second embodiment (full automation) according to the present invention.

FIG. 16 is a view of the VPN service management system 1 for explaining a second embodiment (full automation) according to the present invention.

Note that most of the figure is the same as FIG. 5. The difference resides in that the customer network management center (C-NMS) 13 is clearly shown in the customer management center 8. This is for showing that the full automation is achieved by the cooperation of the C-NMS12 and the P-NMS12.

The point of the second embodiment resides in the following configuration. Namely, the customer network management system (C-NMS) 13 monitors the operation status of the customer network 5 and changes the VPN service conditions by full automation without interposition of an operator through the cooperation of the VPN service agent 3 and both the VPN service manager 2 and the provider network management system (P-NMS) 12 in accordance with the monitoring result.

More concretely, the VPN service agent 3 has a parameter table for pre-setting and holding changed condition data to be referred to when changing the VPN service conditions. Further, the customer network management system 13 is comprised so as to transmit the changed VPN service conditions determined by referring to the parameter table to the VPN service manager when deciding that the VPN service conditions should be changed due to the monitoring result.

Figure 17:
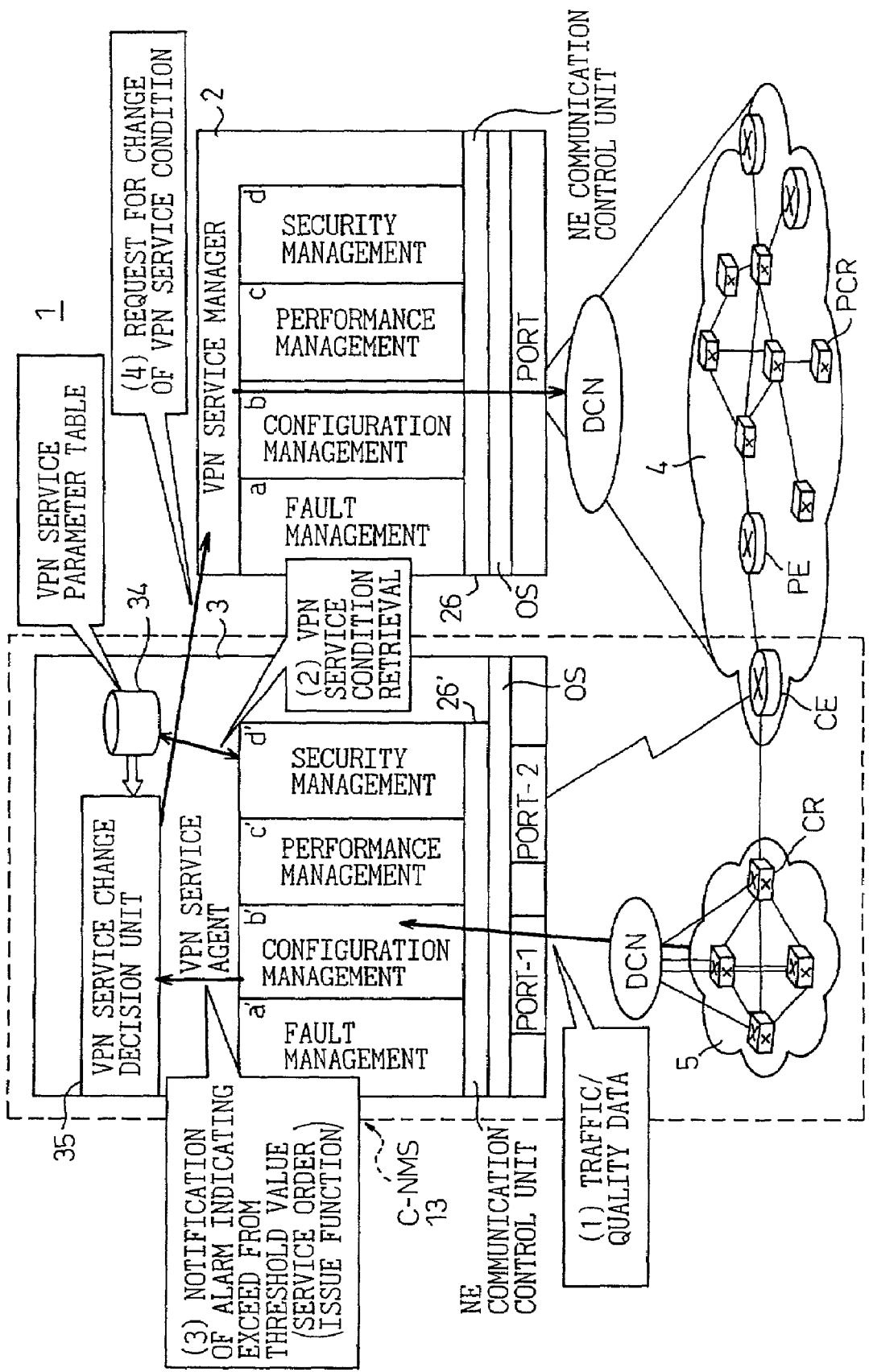
FIG. 17 is a view of the concrete image of the VPN service management system 1 shown in FIG. 16.

FIG. 17 shows a concrete image of the VPN service management system 1 shown in FIG. 16.

Most of the figure is the same as FIG. 14. The difference resides in that the parameter table is shown as reference numeral 34, and the VPN service change decision unit 35 referring to the parameter table 34 is shown. The operation is roughly indicated by (1), (2), (3), and (4) in the figure.

(1) The C-NMS12 first collects the data of the traffic and the service quality of the customer network 5.

(2) On the other hand, the C-NMS12 retrieves the VPN service conditions given to the concerned customer by referring to the parameter table 34.

(3) The data collected in the above (1) is compared with the threshold values stored in the parameter table 34. When detecting that the data exceeds any threshold value, an alarm indicating that a threshold value is exceeded is notified to the VPN service change decision unit 35. This is the function of issuing a service order (means 32 of FIG. 9).

(4) When receiving the notification, the VPN service change decision unit 35 refers to the parameter table 34 and transfers the request for change to the VPN service quality capable of covering the amount by which from threshold value is exceeded to the VPN service manager 2 automatically without the interposition of an operator.

Then the VPN service manager 2 controls the network elements (NE) in the provider network 4 so as to meet that request.

Concretely summarizing the above, the C-NMS12 manages the conditions concerning the operation status of the customer network 5, for example, the frequency of access through the Internet to the customer network 5 and the rate of flow of traffic to the customer edge (CE). The VPN service agent 3 holds the type of the threshold value, degree of increase, etc. when these conditions exceed a certain threshold value and the VPN service parameter change conditions in the parameter table 34 as the VPN parameters.

When the C-NMS12 detects that a threshold value of the operation conditions of the customer network 5 has been exceeded, the VPN service agent 3 refers to the parameter table 34, then reflects the changed conditions found into the provider network 4 by the VPN service manager 2 and the P-NMS12. Due to this, it is possible to immediately meet the VPN service conditions in accordance with the operation status of the customer network 5 without the interposition of the operation manager of the customer network 5 and the operation manager of the provider network 4. Here, the parameter table will be simply explained.

Figure 18:
FIG. 18 is a view schematically showing a parameter table 34.

FIG. 18 is a view schematically showing the parameter table 34.

The content of the table of the top part of the figure is the same as the content of the table 14 shown at the top part of FIG. 7 mentioned above. The VPN service change decision unit 35 decides to change the content of table 34 of the top part of the figure as for example shown in the bottom part of the figure. There are a plurality of levels of decision.

Level 1 is for when assuming the current value is the value of the "Best Effort" and changes that value to a 20% increase.

Level 2 is for when the current value is the value of the 20% increase and changes that value to a 50% increase.

Level 3 is for when the current value is the value of the 50% increase and changes that value to a 100% increase. That is, the higher the level, the broader the changed bandwidth.

Next, the operation under the above mentioned second embodiment will be explained.

Figure 19:
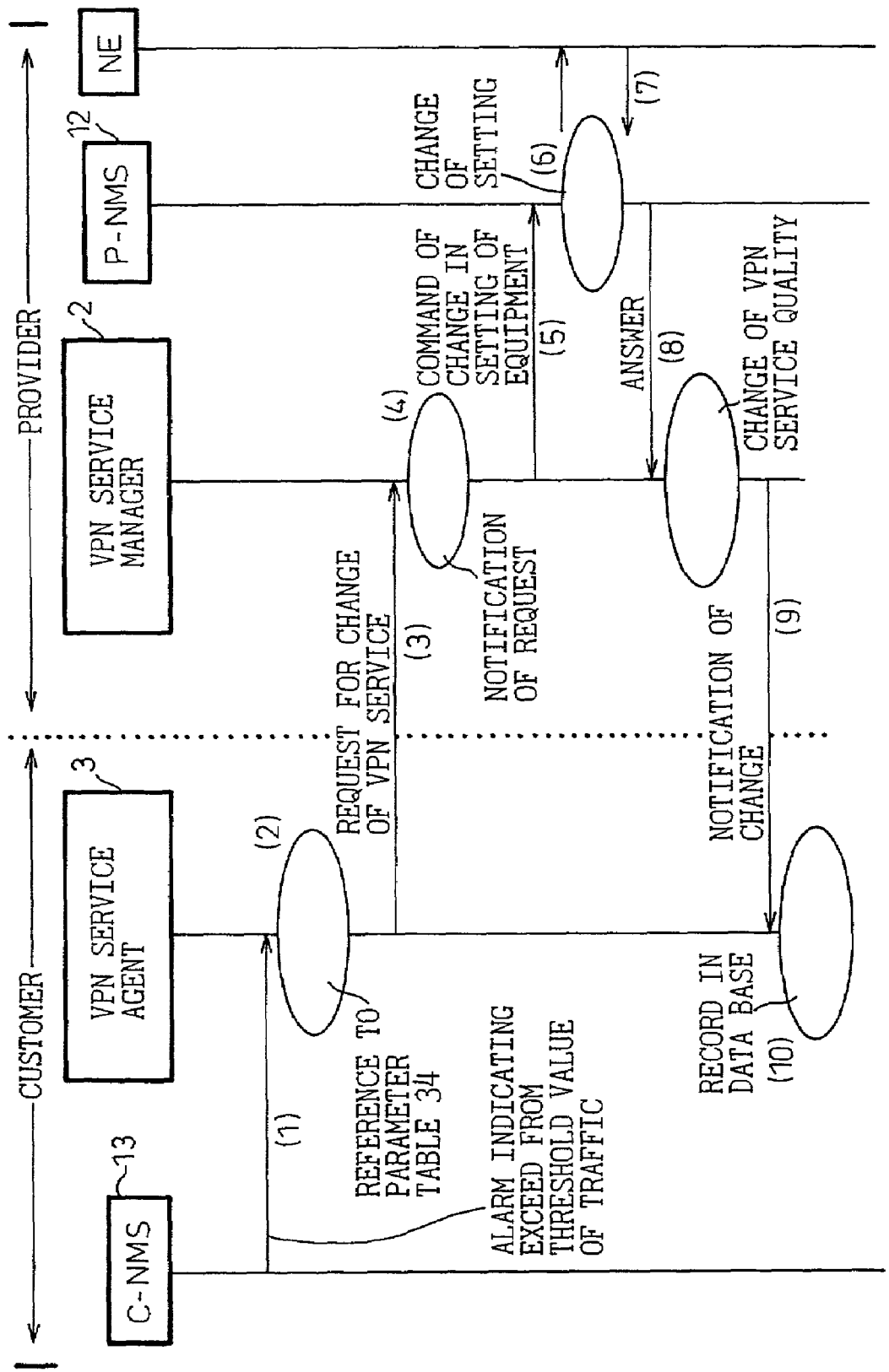
FIG. 19 is a view of a series of sequences under the second embodiment shown in FIG. 16.

FIG. 19 is a view of a series of sequences under the second embodiment shown in FIG. 16.

Assume now that the company receiving the provision of the VPN service suddenly experiences congestion of its network in a certain time band. For this reason, that company desires to rapidly change the VPN service conditions. The change is performed automatically by the following procedure.

(1) When the C-NMS12 on the customer side judges that the threshold value has been exceeded, the VPN service agent 3 sends an alarm indicating that the traffic threshold value has been exceeded ((1) in the figure).

The VPN service change decision unit 35 judges that the threshold value of the C-NMS has been exceeded. The judgment logic is installed in the decision unit 35 in advance. The contents thereof are for example as follows.

TABLE 1

| Level | Packet loss | Traffic threshold |
| --- | --- | --- |
| Level 1 | One fault message | Threshold 90%: 5 times |
| Level 2 | Five fault messages | Threshold 90%: 10 times |
| . | . | . |
| . | . | . |
| . | . | . |

(2) The VPN service agent 3 refers to the parameter table 34 ((2) in the figure). Then, it compares this with the present service under that parameter and selects the optimal level of the VPN service conditions.

(3) When a new VPN service condition is selected, the VPN service agent 3 automatically requests a change to the new VPN service to the VPN service manager 2 ((3) in the figure).

(4) The VPN service manager 2 receiving the notification of the request reads the current usage bandwidth of the customer and judges whether or not the request for change is possible ((4) in the figure).

If the change is impossible, the VPN service manager 2 notifies that it is "IMPOSSIBLE" to the VPN service agent 3 of the customer.

(5) Conversely, when the request for change is "POSSIBLE", the change of service is notified as a command for change of settings of the network elements to the P-NMS12 ((5) in the figure).

(6) The P-NMS12 issues a command for change of settings of the network elements, for example, a policy setting, to the network elements (NE) on the provider side according to the conditions indicated in the parameter table 34. By this, the VPN service contents of the company side are changed. According to this example, the bandwidth of the network becomes broader, so the congestion and the packet loss are automatically solved and suppressed ((6) in the figure).

(7) When the settings of the network elements (NE) are successfully changed, the success is notified to the P-NMS12 ((7) in the figure).

(8) When succeeding in changing to the new service by the above description, the P-NMS12 sends a reply to this effect to the VPN service manager 2 ((8) in the figure).

(9) The VPN service manager 2 notifies the change to the VPN service agent 3 on the customer side by utilizing the concerned VPN service ((9) in the figure).

(10) When the change to new service is notified, the VPN service agent 3 records the parameters of the present service in the database (database for storing the parameter table 34) ((10) in the figure).

As described above, by increasing the VPN service bandwidth for a certain period, congestion of the network can be automatically dealt with.

Third Embodiment

Next, an explanation will be made of semi-automation of VPN service management in the VPN service management system according to the present invention.

Figure 20:
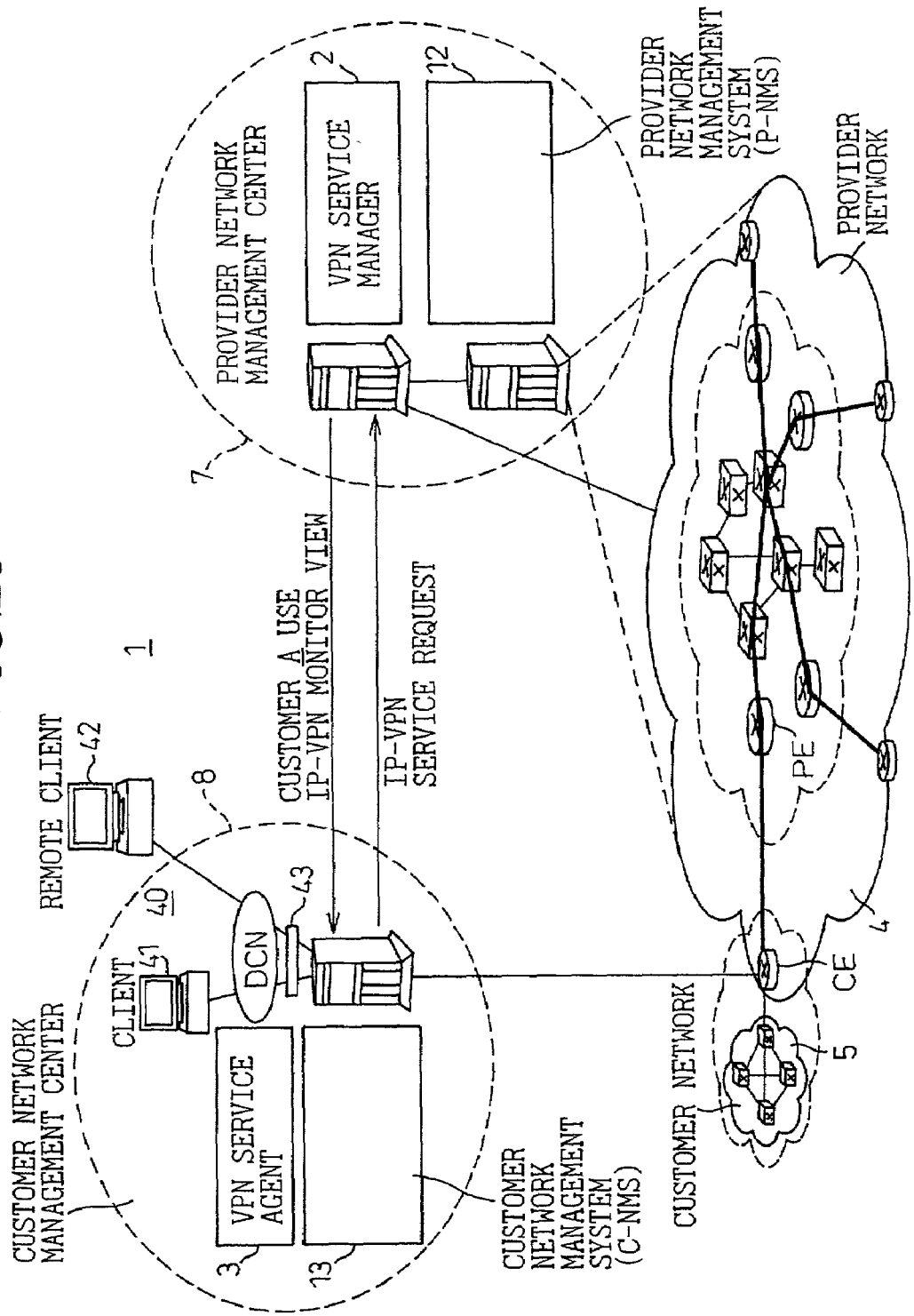
FIG. 20 is a view of the VPN service management system 1 for explaining a third embodiment (semi-automation) according to the present invention.

FIG. 20 is a view of the VPN service management system 1 for explaining a third embodiment (semi-automation) according to the present invention.

Note that most of the figure is the same as FIG. 16. The difference resides in that a client terminal 41 placed inside the customer management center 8 and a remote client terminal 42 located at a remote place are shown and that an operation status change notifying means 43 is shown. Note that, the client terminals 41 and 42 will also be referred to overall as an operation manager (40).

The point of the third embodiment resides in the following configuration. Namely, an operation status change notifying means 43 is provided in the VPN service agent 3, when, the customer network management system (C-NMS) 13 monitors the operation status of the customer network 5 and decides that the VPN service conditions should be changed by the monitor result, for notifying the decision to the operation manager 40 of the customer network 5, and this VPN service agent 3 semi-automatically changes the VPN service conditions through cooperation of the VPN service manager 2 and the provider network management system (P-NMS) 12 when receiving a reply giving permission with respect to the notification.

Further concretely, the VPN service agent 3 has a parameter table 34 (refer to FIG. 17) for pre-setting and holding the changed condition data to be referred to when changing the VPN service conditions. When the customer network management system (C-NMS) 13 judges by the monitoring result that the VPN service conditions should be changed, the changed VPN service conditions determined by referring to the parameter table 34 are input to the operation status change notifying means 43.

Note that the view of the concrete image of the VPN service management system 1 based on the third embodiment is almost the same as the above mentioned FIG. 17, so is omitted, but the concrete image of the system 1 may be summarized as follows.

The VPN service agent 3 has an operation status change notifying means 43 for notifying the above mentioned type of threshold value, degree of increase, etc. and the conditions for change of the VPN service parameters together with the VPN parameter table 34 (refer to FIG. 18) to the operation manager 40 of the customer network 5.

When the C-NMS12 detects that a threshold value of the operation conditions of the customer network 5 has been exceeded, the VPN service agent 3 refers to the parameter table 34, then notifies the fact that it has been exceeded to the operation manager 40. Then, the judgment of the operation manager 40 is reflected in the provider network 4 by using the VPN service manager 2 and the P-NMS12. By this, VPN service conditions in accordance with the operation status of the customer network 5 can be promptly met under the judgment of the operation manager 4 without the interposition of the operator of the provider network 4.

Figure 21:
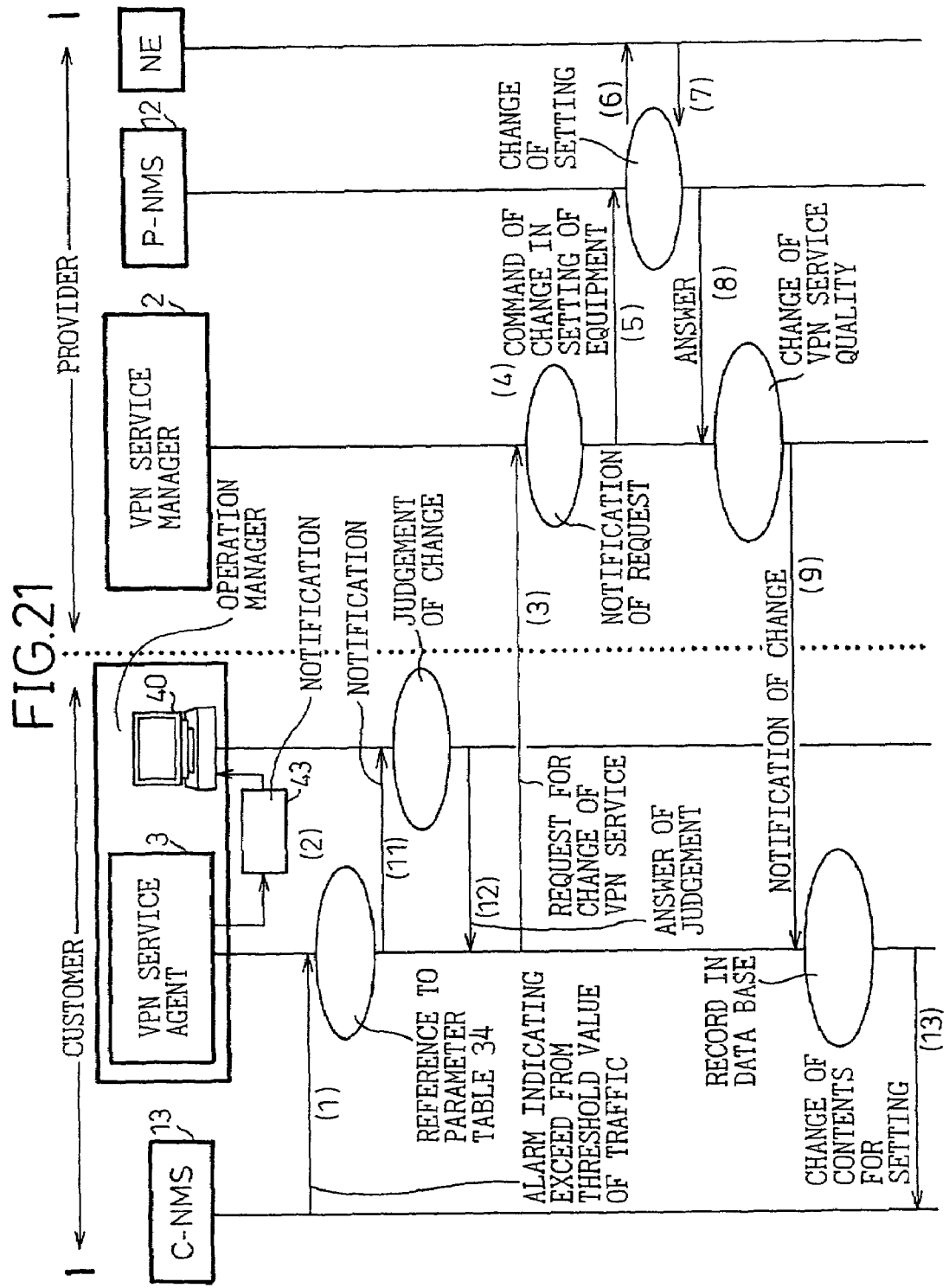
FIG. 21 is a view of a series of sequences under the third embodiment shown in FIG. 20.

FIG. 21 is a view of a series of sequences under the third embodiment shown in FIG. 20.

The figure is similar to the sequence diagram of FIG. 19. Processes similar to each other are indicated by the same numerals in parentheses.

When assuming that a company receiving provision of a VPN service suddenly experiences congestion of the network in a certain time band, the following processes (1), (2), . . . are proceeded with in the following sequence. Note that (11), (12), etc. are processes distinctive to the third embodiment.

(1) Same as (1) of FIG. 19.

(2) Same as (2) of FIG. 19.

(11) The service level (refer to the bottom part of FIG. 18) selected by the VPN service agent 3 is notified to the operation manager 4 ((11) in the figure).

(12) The operation manager 40 judges whether or not this new service level is to be applied to the concerned company and sends back the result of judgment to the VPN service agent 3 ((12) in the figure).

(3) The VPN service agent 3 notified of the result of judgment for the request of change automatically requests the result, as the new VPN service change demand, to the VPN service manager 2.

(4) to (9) are same as (4) to (9) of FIG. 19.

(13) The setting of the VPN service conditions was changed by the above, so this is reflected in the C-NMS12. In the case of semi-automation, unlike the case of full automation mentioned above, the final result cannot be confirmed by the C-NMS12, so this process (13) is necessary.

As described above, by increasing the VPN service bandwidth for a certain period, congestion of the network can be semi-automatically handled.

As mentioned above, in a semi-automation VPN service, when notified that a threshold value has been exceeded or is predicted to be exceeded based on the parameter table 34 set in advance, the VPN service change decision unit 35 (refer to FIG. 17) refers to the service conditions of the parameter table 34 and automatically decide what kind of service should be selected. At this time, that decision is input to the notifying means 43. Based on the concerned input, the operation manager 40 (operator) finally reconfirms the result of the decision by the service change decision unit 35. When there is no problem in the change of the service content, the operator requests the change of the service content to the VPN service manager 2 of the provider network 4.

Thus, the VPN service conditions in accordance with the operation status of the customer network 5 can be promptly met without the interposition of the operation manager of the provider network 4.

Fourth Embodiment

Next, an explanation will be made of server/client type management in the VPN service management system 1 according to the present invention.

Figure 22:
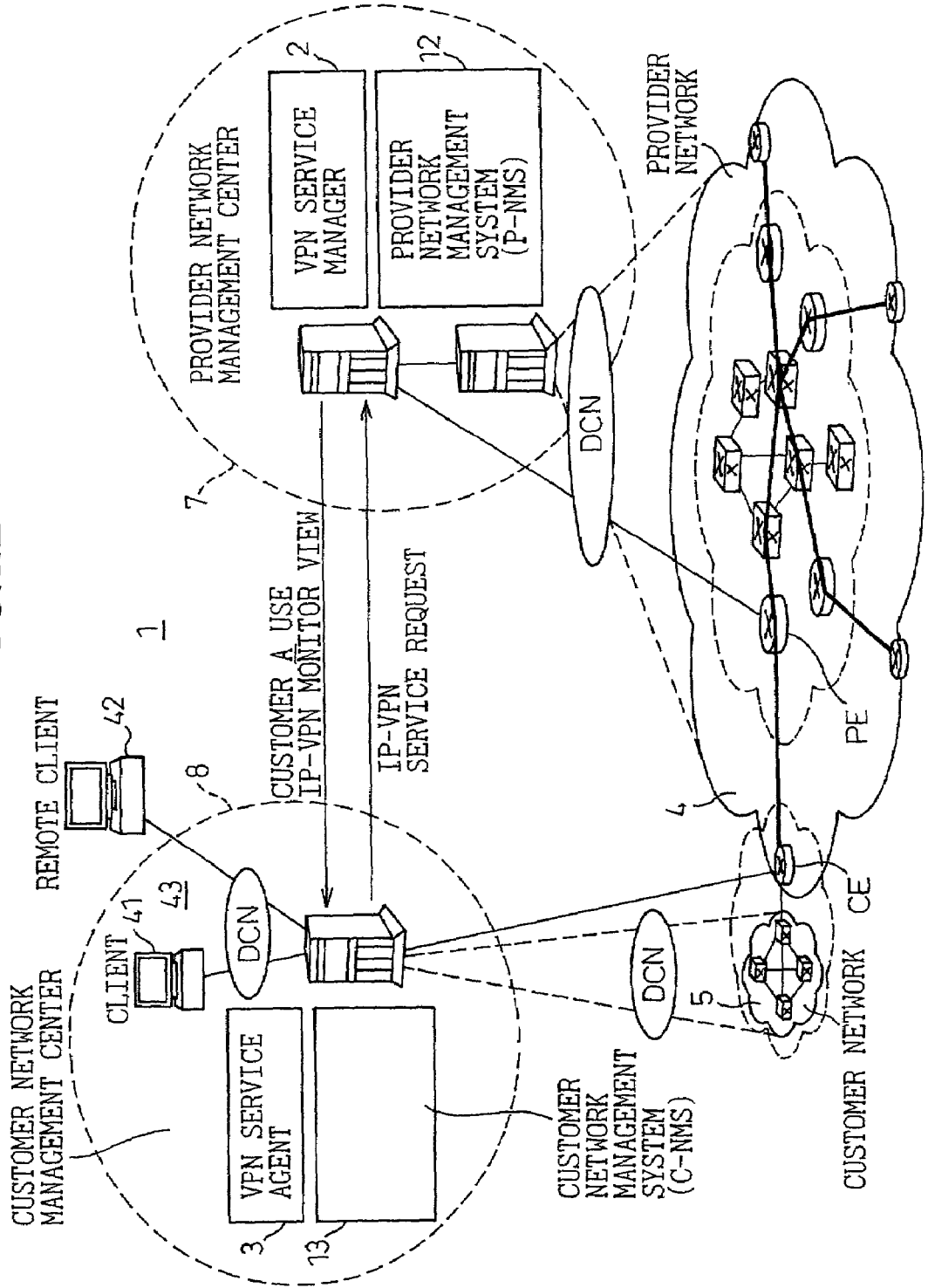
FIG. 22 is a view of the VPN service management system 1 for explaining a fourth embodiment (server/client type) according to the present invention.

FIG. 22 is a view of the VPN service management system 1 for explaining the fourth embodiment (server/client type) according to the present invention.

Note, most of the figure is the same as FIG. 20. The difference resides in that the operation status change notifying means 43 is realized by a server/client mode.

The point of the fourth embodiment resides in the following configuration. Namely, when the VPN service agent 3 and the customer network management system (P-NMS) 13 cooperate in a server/client mode, the remote client terminal 42 attached to the operation manager 40 is introduced as another one of the concerned clients. Further, the VPN service agent 3 and the remote client terminal 42 cooperate in a server/client mode to realize the operation status change notifying means 43.

The VPN service agent 3 and the remote client terminal 42 are more preferably connected by a leased line or in-band.

Figure 23:
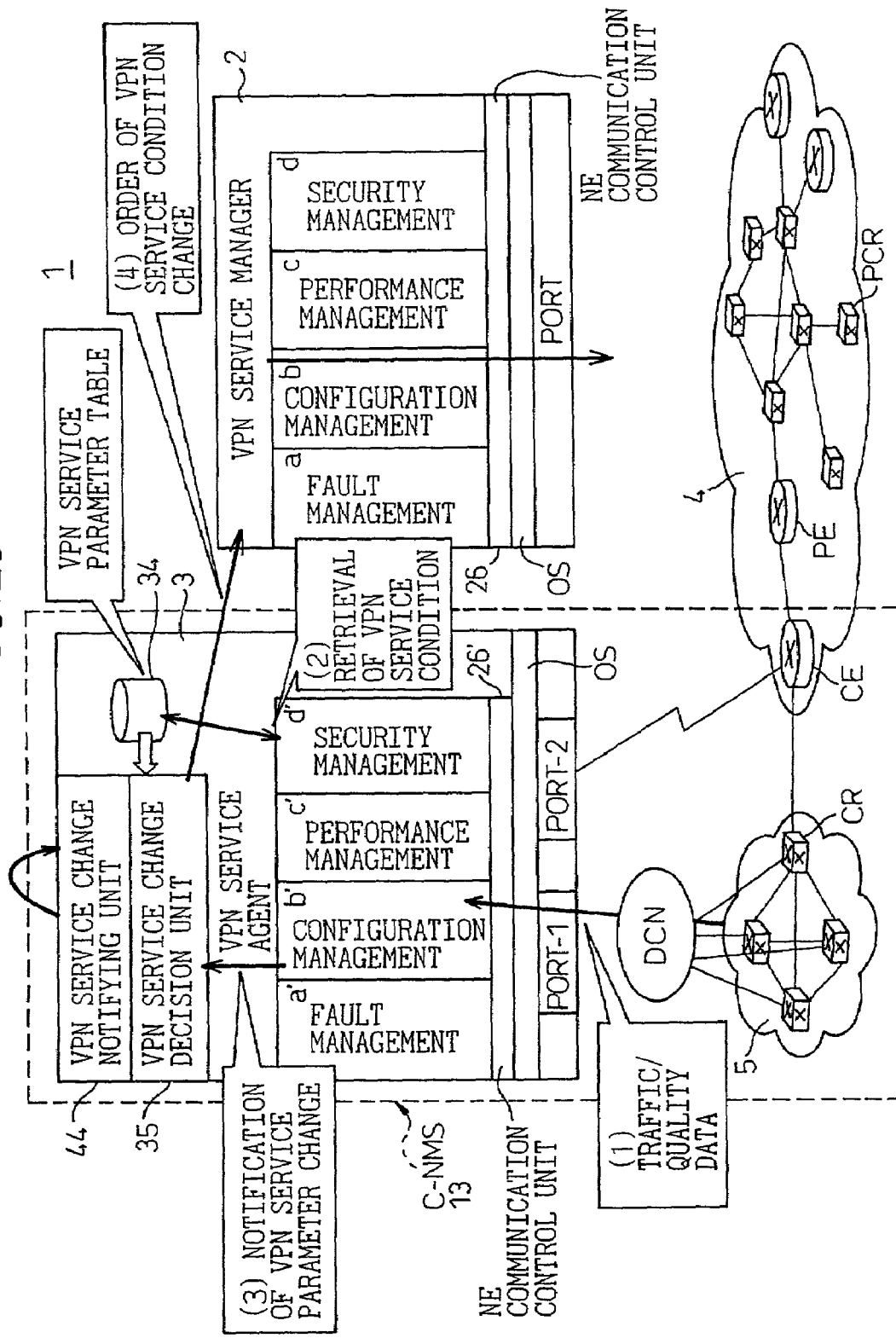
FIG. 23 is a view of the concrete image of the VPN service management system 1 shown in FIG. 22.

FIG. 23 is a view of a concrete image of the VPN service management system 1 shown in FIG. 22.

Most of the figure is the same as FIG. 17. The difference resides in that the operation status change notifying means 43 mentioned above is shown as the VPN service change notification unit 44. Also, among (1), (2), (3), and (4) representing operations, the operation (3) is different. In the fourth embodiment, in this (3), the VPN service change notification unit 44 receives a notification of a change of the VPN service parameters from the C-NMS12 side.

Summarizing the configurations of FIG. 22 and FIG. 23, the operation status change notifying means 43 can be realized as an alarm displaying means on the operation terminals (41, 42) operated with the C-NMS12 and the VPN service agent 3. There is a terminal at a place other than the customer network management center 8. This is connected to the VPN service agent 3 as the remote client terminal 42.

In the case of remote operation, the operation manager terminals (41, 42) and the VPN service agent 3 operate in a server and client relationship and are connected to each other by a corporate LAN or in-band.

Figure 24:
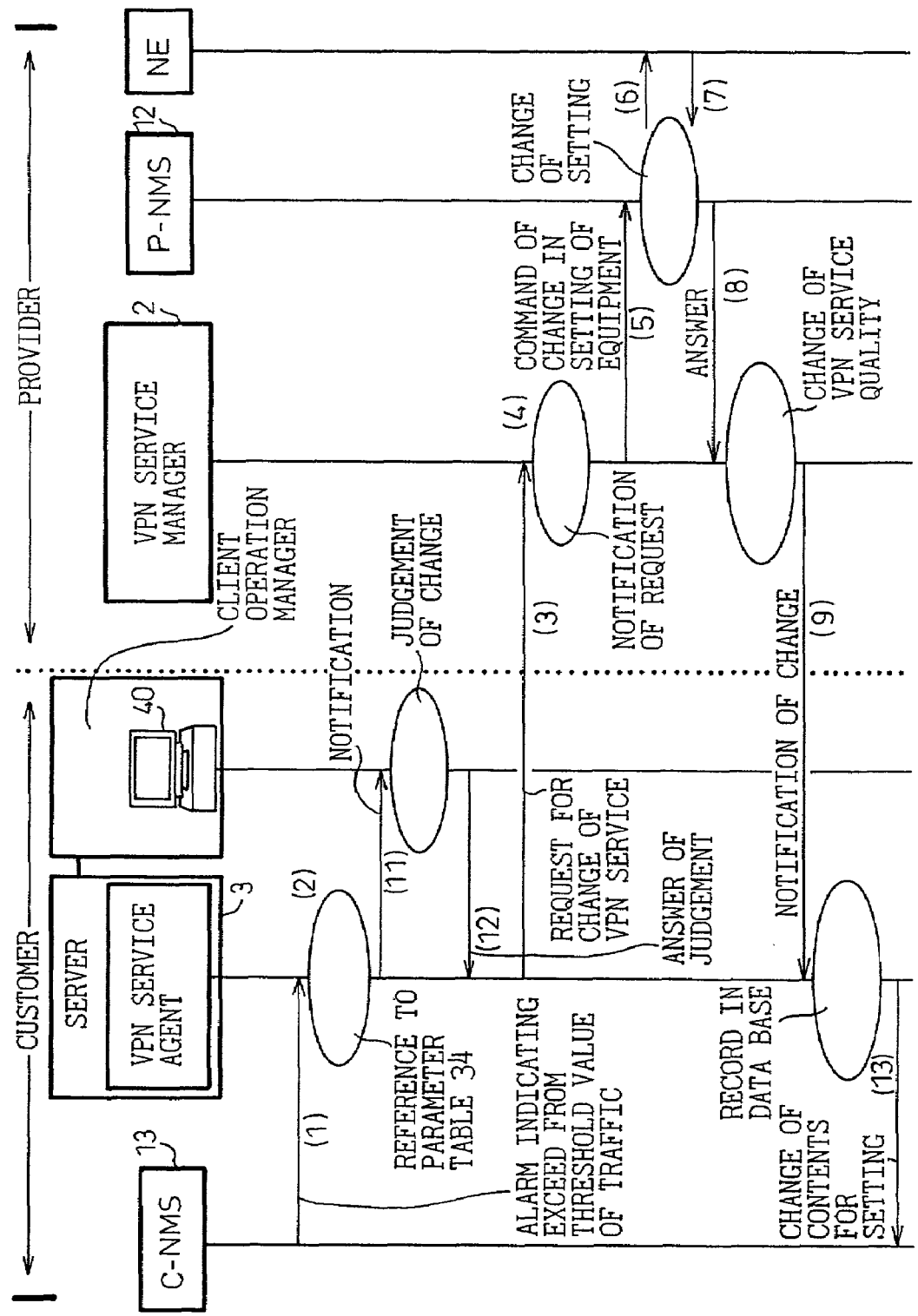
FIG. 24 is a view of a series of sequences under the fourth embodiment shown in FIG. 22.

FIG. 24 is a view of the series of sequences under the fourth embodiment shown in FIG. 22.

The figure is almost the same as the sequence diagram of FIG. 21. Similar processes are indicated by the same numerals in parentheses. The particularly different point resides in that the VPN service agent 3 and the terminals (41, 42) of the operation manager 40 are represented in a server/client mode in the top part of FIG. 24.

Accordingly, the processes (1) to (13) of the figure are the same as the processes (1) to (13) of FIG. 21, but this is different from the third embodiment in the point of the VPN service by remote operation.

In this VPN service, the person responsible for the operation of the customer network 5 (president, operator, etc.) can ask for a request for change of service to the provider side by the remote client 42 from time to time. The remote client 42 is connected to the service agent 3 of the customer network 5 and determines the service conditions in the parameter table 34 by the judgment of the person responsible for operation of the customer network 4. Based on the result, the service agent 3 side requests the service contents to the VPN service manager 2 of the provider network 4. The remote client 42 is connected to the service agent 3 of the customer network 5 by a leased line or in-band, so there is no problem in security.

Also, by the remote operation, the operation manager 40 can manage the VPN not only at a fixed location, but also at a remote location. As described above, by increasing the VPN service bandwidth for a certain period, congestion of the network can be dealt with by remote operation.

Fifth Embodiment

Next, an explanation will be made of remote permission response type of management in the VPN service management system 1 according to the present invention.

Figure 25:
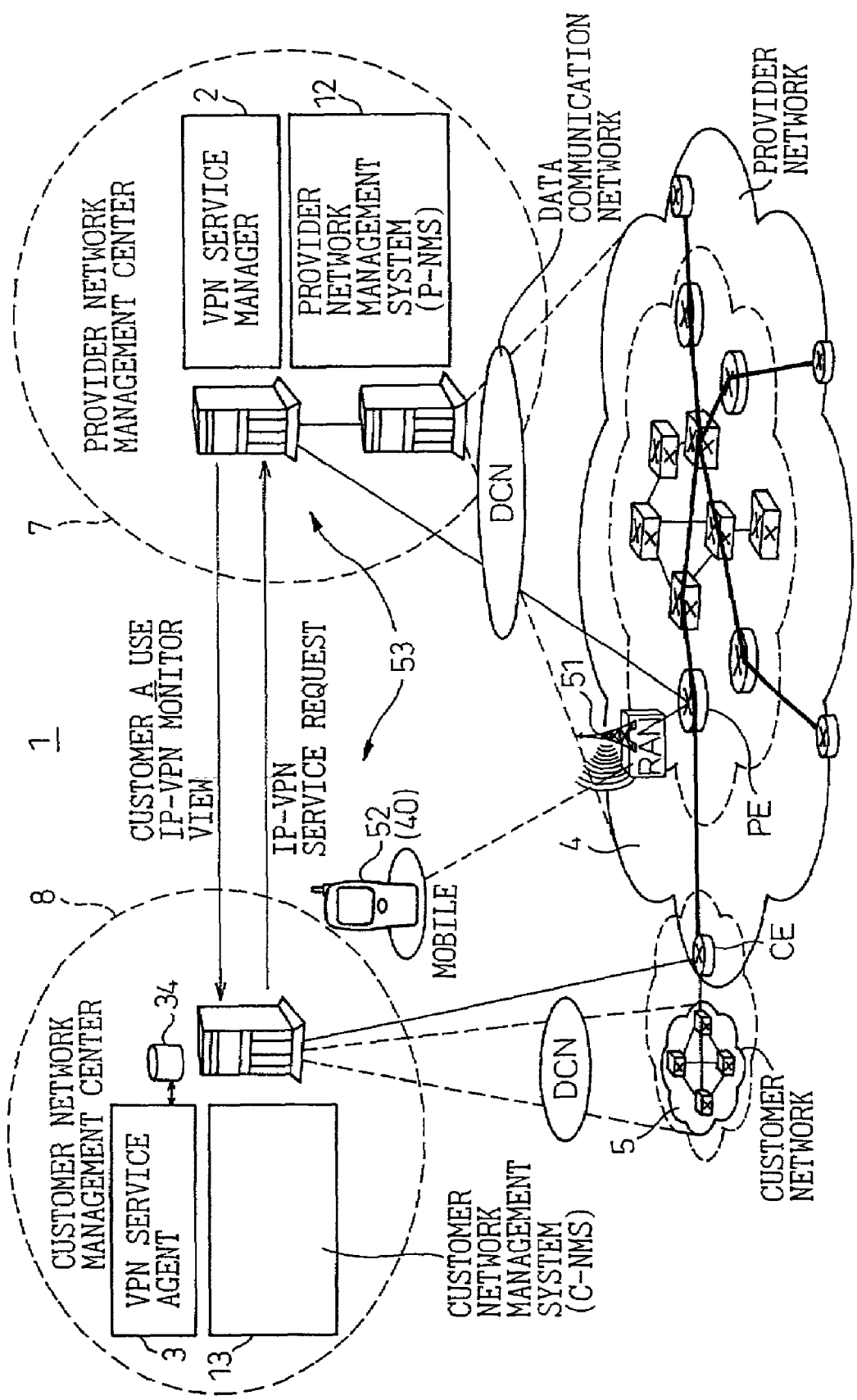
FIG. 25 is a view of the VPN service management system 1 for explaining a fifth embodiment (remote permission response type) according to the present invention.

FIG. 25 is a view of the VPN service management system 1 for explaining the fifth embodiment (remote permission response type) according to the present invention.

Note that most of the figure is the same as FIG. 16 mentioned above. The difference resides in that, as an example, a radio area network (RAN) 51 and a mobile terminal 52 are shown.

The point of the fifth embodiment resides in the following configuration. Namely, an operation status change confirming means 53 is provided in the VPN service manager 2 side, when the customer network management system (C-NMS) 13 monitors the operation status of the customer network 5, for requesting confirmation to the customer, that is, the remote operation manager 40, upon receipt of a request to the VPN service manager 2 for automatically changing of the VPN service conditions in accordance with the monitoring result, and the VPN service manager 2 changes the VPN service conditions when obtaining a reply of permission with respect to the notification.

More concretely, the operation status change confirming means 53 is realized by the VPN service manager 2 and the mobile terminal 52 wirelessly connected to the provider network.

In this case, as mentioned above, the VPN service agent 3 has a parameter table 34 for pre-setting and holding the changed condition data which should be referred to when changing the VPN service condition. The customer network management system 13 transmits the changed VPN service conditions determined by referring to the parameter table 34 to the VPN service manager 2 when judging that the VPN service condition should be changed according to the monitoring result.

Figure 26:
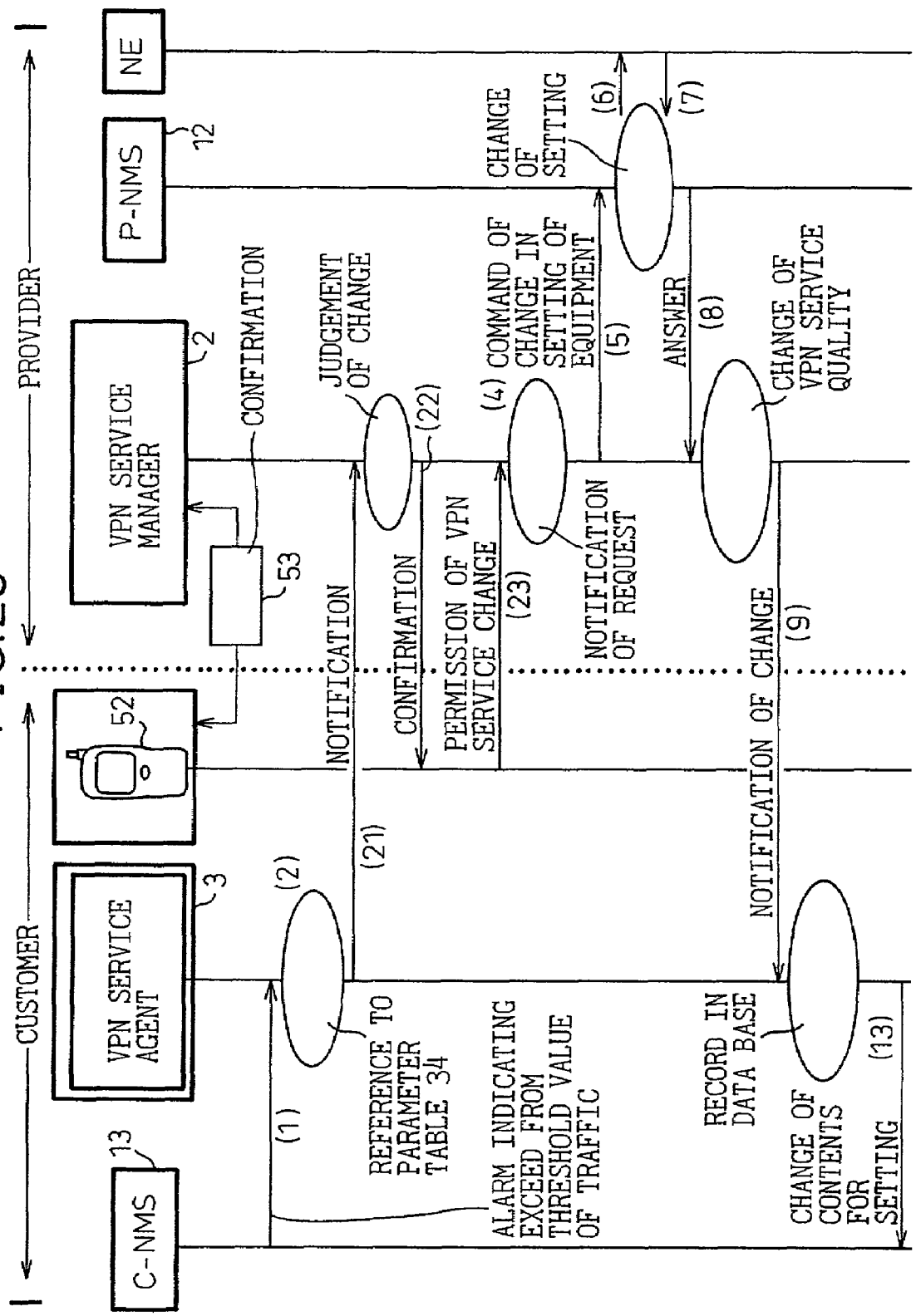
FIG. 26 is a view of a series of sequences under the fifth embodiment shown in FIG. 25.

FIG. 26 is a view of a series of sequences under the fifth embodiment shown in FIG. 25.

The figure is similar to the sequence diagram of FIG. 21. Similar processes are indicated by the same numerals in parentheses. The particular difference resides in that the mobile terminal 52 and the operation status confirming means 53 are represented at the top part of FIG. 26. Also, when looking at the process, the notification process (11) of FIG. 21 becomes the notification process (21) extended to the VPN service manager 2 in FIG. 26, the process (22) for confirmation of a request for change made via the process (21) is added to the operation manager (mobile terminal) 52, and the process (23) for returning a reply for permission obtained by that confirmation from the mobile terminal 52 to the manager 2 is added.

Summarizing the configurations of FIG. 25 and FIG. 26, in the VPN service, the operation status change confirming means 53 is made able to use the Internet mail or the portable telephone (52) to change the VPN service conditions from a location other than the operation management center 8 of the customer network 5 as well. That is, there is a mobile terminal 52 in addition to the customer network management center 8. The VPN service is controlled semi-automatically by remote operation.

Information is sent to the mobile terminal 52 (customer operation manager) via the RAN 51 of the provider network 4. Note that the method of connection to the customer operation manager (52) for confirmation as in the embodiment described above is as follows.

Figure 27:
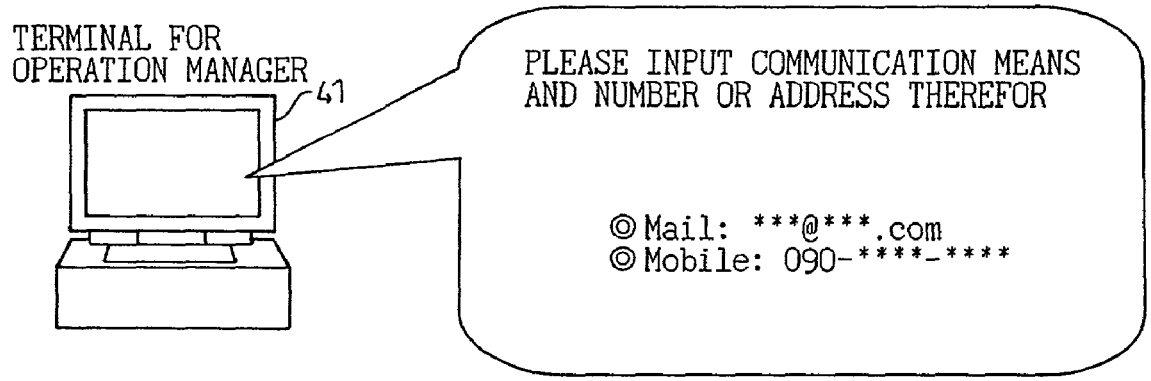
FIG. 27 is a view schematically representing a connection method to an operation manager.

FIG. 27 is a view schematically showing the method of connection to the operation manager, while FIG. 28 is a view schematically showing advance preparations with the operation manager.

According to FIG. 27, the terminal 41 of the operation manager 40 selects the method of connection (communication means) in advance.

Next, the mail address (Mail) of the destination or the number of the portable telephone (Mobile) is input.

Referring to FIG. 28, the content of the mail sent to the mobile terminal 52 is illustrated.

As the above advance preparations, it is necessary to set the contract contents of the VPN service conditions. An example of the contents is shown in FIG. 28.

When performing the control at the mobile terminal 52, the contract contents are set in advance as the advance preparations for simplifying the operation at the mobile terminal 52. This makes it possible for the owner of the terminal 52 to easily respond. For example, he or she may press the # key to input the number. The terminal 52 may be notified by voice or mail.

Thus, the operation manager 40 can dynamically change the VPN service conditions by the selection of the mail address or the number of the mobile terminal. Even if the manager of the customer network 5 is absent, there is no influence upon the VPN service of the customer.

That is, even if the customer side operation manager 40 is not in the network management center 8, it is possible to set the VPN service conditions, for example, increase the VPN service bandwidth.

Sixth Embodiment

Next, an explanation will be made of a mode of communication between the manager and an agent in the VPN service management system 1 according to the present invention.

FIG. 29 is a view of the configuration of FIG. 17 with the sixth embodiment applied thereto.

Accordingly, most of the figure is the same as the configuration of FIG. 17. The difference resides in that a customer side in-band means 61 and a provider side in-band means 62 are shown.

The point of the sixth embodiment resides in the following configuration. Namely, in-band means for using the VPN per se, as in-band, constructed by a contract between the provider and the customer is provided for cooperation between the VPN service manager 2 and the VPN service agent 3.

Concretely, the in-band means 61 and 62 are formed as illustrated by reference numerals 61 and 62 at the customer edge (CE) and the provider edge (PE) arranged inside the provider network 4 for connection with the customer edge (CE).

Since the in-band is utilized in this way, the operation of (4) ("VPN service condition change order") in FIG. 17 is carried out through the route 63 in-band as shown in FIG. 29.

Summarizing this, according to the sixth embodiment, by using the VPN per se contracted for between the provider and the customer in-band as the communication means between the VPN service agent 3 and the VPN service manager 2, a change of the VPN service conditions can be communicated without introducing a new independent communication means. Also, security can be simultaneously maintained.

Next, the in-band means will be explained.

FIG. 30 is a view explaining the in-band means according to the present invention.

In the figure, the customer edge (CE) is provided with a mechanism (in-band means 61) for transferring information at the monitor use port by VPN in-band.

Similarly, the provider edge (PE) is provided with a mechanism (in-band means 62) for transferring the information at the monitor use port by VPN in-band.

In order to realize the mechanism necessary for this provider edge, the following two information (i) and (ii) are set in advance as configuration data on the provider edge PE:

(i) IP address of the VPN service agent 3 managing the concerned provider edge (PE).

(ii) Identifier (VPN-id) of VPN through which the information should pass between the customer and the provider.

On the other hand, in order to realize the mechanism necessary for the customer edge (CE), the method of connection of the customer edge (CE) and the VPN service agent 3 must be considered. Two plans of this method of connection are shown in the figure.

FIG. 31 is a view of a first connection method between the customer edge (CE) and the agent 3, while FIG. 32 is a view of a second connection method between the customer edge (CE) and the agent 3.

FIG. 31 shows a method of directly connecting the customer edge (CE) from the maintenance terminal use Ethernet port on the customer edge (CE) side to the agent 3 without via the network.

FIG. 32 shows a method of connecting the customer edge (CE) and the agent 3 via the network (customer network 5).

FIG. 33 is a view of an example of connection between the manager 2 and the agent 3 under the in-band mode.

This will be explained according to the figures.

(1) The control information reaches up to the customer edge (CE) of the concerned VPN (customer A network) by the above (ii), that is, VPN-id. Next, (2) the control information departs for the network (customer A network) side by either of the above two connection methods (FIG. 31, FIG. 32), then (3) the control information reaches the VPN service agent A(3-A) of the intended IP address by the above (i), that is, the IP address.

Note that, for the communication means between the provider edge (PE) and the VPN service manager 2, there are known techniques such as the method of setting an independent VPN network and the method of leasing an existing VPN from the provider edge (PE) to the middle and utilizing the IP network between the middle and the VPN service manager 2.

While the overall VPN service management system 1 according to the present invention was explained in detail above, the characteristic feature of the present invention resides in not only the system 1 as a whole, but also the VPN service manager 2 per se and the VPN service agent 3 per se comprising that system 1. The characteristic configuration of the VPN service manager 2 per se and the characteristic configuration of the VPN service agent 3 will be summarized on the basis of the explanation based on FIG. 1 to FIG. 30 mentioned above.

First, the characteristic configuration of the VPN service manager 2 per se is as follows.

(A) The VPN service manager 2 is a VPN service manager comprising part of a VPN service management system 1 for managing a VPN service for a communication network provided with a customer network 5 servicing customers and a provider network 4 constructed by a provider for providing the VPN service to the customers and connected to the customer network 5.

This manager 2 is comprised so as to manage the VPN service for the provider network 4 and to change the VPN service conditions of the VPN service to be provided by the VPN service management system 1 in real time in accordance with the operation status of the customer network 5 under the management of the VPN service agent 3 in cooperation with the VPN service agent 3 managing the VPN service for the customer network 5.

Further, this manager 2 is comprised of a VPN service order control means 21 for receiving an order for changing a VPN service condition when the order is generated from the VPN service agent 3 and outputting the changed VPN service condition related to that order, a VPN service condition retrieval means 22 for retrieving a present VPN service condition given to the concerned customer network 5 from the VPN service condition table 14 when that order is generated, a VPN service condition decision means 23 for deciding whether or not a range by which the changed VPN service condition exceeds the present VPN service condition is within an allowable range, a VPN service condition setting means 24 for resetting the present VPN service condition to the changed VPN service condition when the result of the decision is "POSSIBLE", and a customer edge control means 25 for controlling a customer edge (CE) based on the reset VPN service condition.

Here, the manager 2 has an operation status change notifying means 43 for notifying an operation manager 40 of the customer network 5 of a request for change of a VPN service condition from the customer network management system 13 automatically in accordance with a monitoring result when a customer network management system (C-NMS) 13 monitors the operation status of the customer network 5 and changes the VPN service condition when obtaining a reply of permission with respect to the notification.

(B) On the other hand, the VPN service agent 3 is a VPN service agent comprising part of a VPN service management system 1 for managing a VPN service for a communication network provided with a customer network 5 servicing customers and a provider network 4 constructed by a provider for providing the VPN service to the customers and connected to the customer network 5.

This agent 3 is comprised so as to manage the VPN service for the customer network 5 and to change a VPN service condition of the VPN service to be provided by the VPN service management system 1 in real time in accordance with the operation status of the customer network 5 under management in cooperation with a VPN service manager 2 managing a VPN service for a provider network 4.

Further, this agent 3 has a customer network management system (C-NMS) 13 for managing the customer network 5. This customer network management system 13 monitors the customer edge (CE) and communicates with the provider network 4 side.

Further, this agent 3 is provided with a service menu concerning the VPN service from the VPN service manager 2 as a VPN service condition table 14 and transmits a request for change via the service menu to the VPN service manager 2 when a request for change of a VPN service condition is generated at the customer side.

Also, this agent 3 is provided with a VPN service condition retrieval means 31 for retrieving a current VPN service condition given to the concerned customer network 5 from the VPN service condition table 14 when an order for changing a VPN service condition is generated from the customer and a VPN service order issuing means 32 for issuing an order to the VPN service manager 2 based on the retrieved VPN service condition.

Further, this agent 3 has a parameter table 34 for pre-setting and holding changed condition data to be referred to when changing a VPN service condition. The customer network management system (C-NMS) 13 transmits the changed VPN service condition determined by referring to the parameter table 34 to the VPN service manager 2 when deciding that the VPN service condition should be changed by the monitoring result.

Furthermore, this agent 3 has an operation status change notifying means 43 for notifying a decision to an operation manager 40 of the customer network 5 when the customer network management system 13 monitors the operation status of the customer network 5 and decides that a VPN service condition should be changed by the monitoring result and changes the VPN service condition by cooperation of the VPN service manager 2 and a provider network management system (P-NMS) 12 when obtaining a reply of permission with respect to the notification.

As explained in detail above, according to the present invention, in a VPN service, the following effects can be obtained.

1) A request on the customer side that the contract conditions between the customer and the provider be changed can be rapidly responded to.

2) The quality conditions and usage conditions of a VPN service such as an IP-VPN service can be easily changed.

3) The service level agreement contracted for between a customer and the provider can be always fulfilled.

While the invention has been described with reference to specific embodiments chosen for purpose of illustration, it should be apparent that numerous modifications could be made thereto by those skilled in the art without departing from the basic concept and scope of the invention.

What is claimed is:
1. A VPN service management system for managing a VPN service for a communication network provided with a customer network for servicing customers and a provider network constructed by a provider for providing the VPN service to the customers and connected to the customer network, comprising:
   a VPN service manager apparatus for managing said VPN service for said provider network, said VPN service manager apparatus being configured to cooperate with a provider network management system managing said provider network, said provider network including a customer edge arranged in said customer network for connection with said provider network; and
   a VPN service agent apparatus for managing said VPN service for said customer network, said VPN service agent apparatus being configured to cooperate with a customer network management system managing said customer network, said customer network management system monitoring said customer edge and communicating with said provider network, wherein
   said VPN service manager apparatus changes a VPN service condition of said VPN service to be provided in real time in accordance with an operation status of said customer network in cooperation with said VPN service agent apparatus,
   said VPN service manager apparatus provides a service menu concerning the VPN service as a VPN service condition table to said VPN service agent apparatus,
   when there is a request for change of a VPN service condition on said customer network, the VPN service agent apparatus transmits the request for change to the VPN service manager apparatus via said service menu, and
   the VPN service manager apparatus reflects the request for change in said provider network via said provider network management system.

2. A VPN service management system as set forth in claim 1, wherein
   said system provides in said VPN service agent apparatus an operation status change notifying means for notifying a decision to an operation manager of said customer network when said customer network management system monitors the operation status of said customer network and decides that said VPN service condition should be changed by the monitoring result, and
   the VPN service agent apparatus semi-automatically changes said VPN service condition by cooperation of said VPN service manager apparatus and said provider network management system when obtaining a reply of permission with respect to said notification.

3. A VPN service management system as set forth in claim 2, wherein,
   when said VPN service agent apparatus and said customer network management system cooperate in a server/client mode, a remote client terminal attached to said operation manager is introduced as another client, and
   said operation status change notifying means is realized by cooperation of said VPN service agent apparatus and said remote client terminal in the server/client mode.

4. A VPN service management system as set forth in claim 3, wherein said VPN service agent apparatus and said remote client terminal are connected by a leased line or in-band.

5. A VPN service management system as set forth in claim 2, wherein
   said VPN service agent apparatus has a parameter table for pre-setting and holding changed condition data to be referred to when changing said VPN service condition, and
   said VPN service agent apparatus inputs the changed VPN service condition determined by referring to said parameter table to said operation status change notifying means when said customer network management system judges by said monitoring result that said VPN service condition should be changed.

6. A VPN service management system as set forth in claim 1,
   said system providing at said VPN service manager apparatus an operation status change confirming means for requesting confirmation at a remote operation manager of a customer upon receipt of a request when said customer network management system monitors the operation status of said customer network and automatically requesta a change of said VPN service condition to said VPN service manager apparatus in accordance with the monitoring result, and
   said VPN service manager apparatus changes said VPN service condition when obtaining a reply of permission with respect to said notification.

7. A VPN service management system as set forth in claim 6, wherein said operation status change confirming means is realized by said VPN service manager apparatus and a mobile terminal wirelessly connected to said provider network.

8. A VPN service management system as set forth in claim 6, wherein
   said VPN service agent apparatus has a parameter table for pre-setting and holding changed condition data to be referred to when changing said VPN service condition, and
   said customer network management system transmits the changed VPN service condition determined by referring to said parameter table to said VPN service manager apparatus when judging that said VPN service condition should be changed according to said monitoring result.

9. A VPN service management system as set forth in claim 1, wherein said VPN service agent apparatus is comprised of:
   a VPN service condition retrieval means for retrieving a current VPN service condition given to the customer network from the VPN service condition table when an order for changing the VPN service condition is generated from a customer; and
   a VPN service order issuing means for issuing the order to the VPN service manager apparatus based on the retrieved VPN service condition.

10. A VPN service management system as set forth in claim 9, wherein the VPN service manager apparatus is provided with a customer edge control means for controlling the customer edge based on the VPN service condition reset by the VPN service manager apparatus upon receipt of said order when said VPN service manager apparatus controls the customer edge through said VPN service agent apparatus.

11. A VPN service management system as set forth in claim 1, wherein said customer network management system monitors the operation status of said customer network and changes of said VPN service condition by full automation without interposition of an operator through cooperation of said VPN service agent apparatus and both said VPN service manager apparatus and said provider network management system in accordance with the monitoring result.

12. A VPN service management system as set forth in claim 11, wherein said VPN service agent apparatus has a parameter table for pre-setting and holding changed condition data to be referred to when changing said VPN service condition, and said customer network management system transmits the changed VPN service condition determined by referring to said parameter table to said VPN service manager apparatus when deciding that said VPN service condition should be changed by said monitoring result.

13. A VPN service management system as set forth in claim 1, further having an in-band means for using the VPN per se, as in-band, constructed by a contract between said provider and said customer in-band for said cooperation between said VPN service manager apparatus and said VPN service agent apparatus.

14. A VPN service management system as set forth in claim 13, wherein in-band means are formed at said customer edge and a provider edge arranged inside said provider network for connection with the customer edge.

15. A VPN service management system as set forth in claim 1, wherein said VPN service manager apparatus is comprised of:
a VPN service order control means for receiving an order for changing the VPN service condition generated from the VPN service agent apparatus and outputting a changed VPN service condition concerned in that order,
a VPN service condition retrieval means for retrieving a present VPN service condition given to a concerned customer network from the VPN service condition table when that order is generated,
a VPN service condition decision means for deciding whether or not a range by which the changed VPN service condition exceeds the present VPN service condition is within an allowable range,
a VPN service condition setting means for resetting the present VPN service condition to the changed VPN service condition when the result of said decision is "POSSIBLE", and
a customer edge control means for controlling the customer edge based on the reset VPN service condition.

16. A VPN service management system as set forth in claim 1, wherein said VPN service agent apparatus collects the operation status of said customer network for changing the VPN service condition directly from said customer network management system.

* * * * *